(12) United States Patent
Cheriton

(10) Patent No.: US 11,372,708 B2
(45) Date of Patent: *Jun. 28, 2022

(54) AUTOMATIC ROOT CAUSE ANALYSIS USING TERNARY FAULT SCENARIO REPRESENTATION

(71) Applicant: OptumSoft, Inc., Menlo Park, CA (US)

(72) Inventor: David R. Cheriton, Palo Alto, CA (US)

(73) Assignee: OptumSoft, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/942,261

(22) Filed: Jul. 29, 2020

(65) Prior Publication Data

US 2020/0409782 A1 Dec. 31, 2020

Related U.S. Application Data

(63) Continuation of application No. 15/973,847, filed on May 8, 2018, now Pat. No. 10,761,921.

(60) Provisional application No. 62/592,797, filed on Nov. 30, 2017.

(51) Int. Cl.
*G06F 11/00* (2006.01)
*G06F 11/07* (2006.01)
*H04L 41/0631* (2022.01)
*G06F 11/30* (2006.01)
(Continued)

(52) U.S. Cl.
CPC ........ *G06F 11/079* (2013.01); *G06F 11/0709* (2013.01); *G06F 11/0778* (2013.01); *G06F 11/0793* (2013.01); *G06F 11/2257* (2013.01); *G06F 11/3006* (2013.01);
(Continued)

(58) Field of Classification Search
CPC ............... G06F 11/079; G06F 11/0709; G06F 11/0778; G06F 11/0793; G06F 11/2257; G06F 11/30; G06F 11/3051
See application file for complete search history.

(56) References Cited

U.S. PATENT DOCUMENTS 5,845,272 A * 12/1998 Morjaria ................... B60L 3/00
706/50
7,107,185 B1 9/2006 Yemini
7,254,515 B1 8/2007 Ohsie
(Continued)

FOREIGN PATENT DOCUMENTS

CN 105591787 7/2019

OTHER PUBLICATIONS

Ohsie et al., Event Modeling with the MODEL Language, Intergrated Network Management V, Springer Science +Business Media Dordrecht 1997, pp. 626-637.
(Continued)

*Primary Examiner* — Charles Ehne
(74) *Attorney, Agent, or Firm* — Van Pelt, Yi & James LLP

(57) ABSTRACT

A plurality of potential fault scenarios are accessed, wherein a given potential fault scenario of the plurality of potential fault scenarios has at least one corresponding root cause, and a representation of the given potential fault scenario comprises a don't care value. An actual fault scenario from telemetry received from a monitored system is generated. The actual fault scenario is matched against the plurality of potential fault scenarios. One or more matched causes are output as one or more probable root cause failures of the monitored system.

20 Claims, 7 Drawing Sheets

(51) Int. Cl.
*H04L 41/142* (2022.01)
*G06F 11/22* (2006.01)
(52) U.S. Cl.
CPC ...... *G06F 11/3051* (2013.01); *H04L 41/0631* (2013.01); *H04L 41/142* (2013.01)

(56) References Cited

U.S. PATENT DOCUMENTS

| | | | |
|---|---|---|---|
| 2008/0255682 A1 | 10/2008 | Zhao | |
| 2011/0153540 A1* | 6/2011 | Beg | G06F 11/079 706/52 |
| 2015/0074035 A1* | 3/2015 | Narasappa | G06N 7/005 706/52 |
| 2016/0173690 A1 | 6/2016 | Perez | |
| 2017/0041815 A1 | 2/2017 | Fernandez Arboleda | |

OTHER PUBLICATIONS

Yuri Rabover, Intergrated Diagnostics of Root Cause Faults in Complex Network and Systems, Apr. 7, 2009.

* cited by examiner 64-bit known/value block representation

AUTOMATIC ROOT CAUSE ANALYSIS USING TERNARY FAULT SCENARIO REPRESENTATION

CROSS REFERENCE TO OTHER APPLICATIONS

This application is a continuation of U.S. patent application Ser. No. 15/973,847 entitled AUTOMATIC ROOT CAUSE ANALYSIS USING TERNARY FAULT SCENARIO REPRESENTATION filed May 8, 2018, which claims priority to U.S. Provisional Patent Application No. 62/592,797 entitled AUTOMATIC ROOT CAUSE ANALYSIS USING TERNARY FAULT SCENARIO REPRESENTATION filed Nov. 30, 2017, both of which are incorporated herein by reference for all purposes.

BACKGROUND OF THE INVENTION

Systems may have numerous sources of faults, ranging from equipment failures to computer hardware failures to software failures to operator errors. In complex systems, there are many dependencies between interconnected components. Mechanisms for monitoring systems may also be subject to failure as well. Because of dependencies, the failure of one component may lead to another indicating a fault condition and/or symptom. Cascading faults may lead to a large number of alerts, making the task of determining a root cause fault quite difficult. As referred herein, these extra alerts are "symptoms" of the root cause fault.

Prior art approaches to automated route cause analysis have tried to find root causes by looking for statistical correlation between faults, assuming that a strongly correlated fault is the root cause. However, correlation may not indicate causation. Another related statistical approach is to use machine learning techniques to "recognize" different failure scenarios. However, the reliability of this approach is low unless a very large collection of labelled training sets are available which may be expensive and/or impractical.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatic root cause analysis using ternary fault scenarios is disclosed. A "symptom" is referred to herein as a named and/or defined state of some component of a monitored system that is important to distinguish one fault scenario from another. Using a symptom value corresponding to an "unknown" value corresponding to a symptom value that is not known, and a "don't care" value, also referred to as an extraneous value corresponding to a symptom not needed for a particular analysis are disclosed. In one embodiment, each symptom value is restricted to being one of: true, false, or unknown. Thus, a symptom value is referred to herein as being a "ternary" value. In one embodiment, the unknown and the don't care values are designated by the same value, distinguished as one or the other based on the context of usage.

Figure 1:
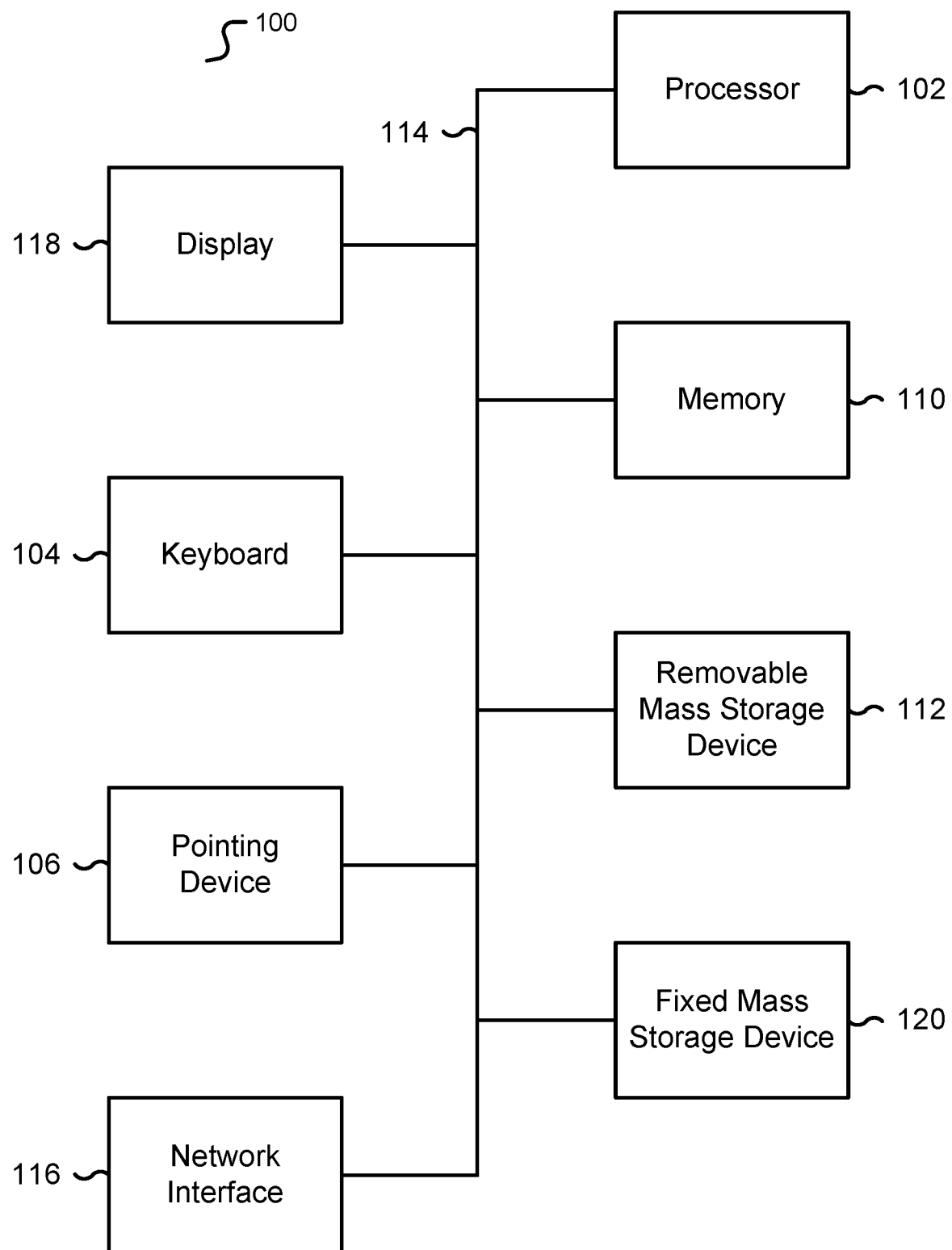
FIG. 1 is a functional diagram illustrating a programmed computer/server system for automatic root cause analysis using ternary fault scenarios in accordance with some embodiments.

FIG. 1 is a functional diagram illustrating a programmed computer/server system for automatic root cause analysis using ternary fault scenarios in accordance with some embodiments. As shown, FIG. 1 provides a functional diagram of a general purpose computer system programmed to provide automatic root cause analysis in accordance with some embodiments. As will be apparent, other computer system architectures and configurations may be used for automatic root cause analysis.

Computer system 100, which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general purpose digital processor that controls the operation of the computer system 100. Using instructions retrieved from memory (110), the processor (102) controls the reception and manipulation of input data, and the output and display of data on output devices, for example display and graphics processing unit (GPU) (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as well known in the art, primary storage typically includes basic operating instructions, program code, data, and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system 100, and is coupled either bi-directionally (read/write) or uni-directionally (read only) to processor (102). For example, storage (112) can also include computer-readable media such as flash memory, portable mass storage devices, holographic storage devices, magnetic devices, magneto-optical devices, optical devices, and other storage devices. A fixed mass storage (120) can also, for example, provide additional data storage capacity. One example of mass storage (120) is an eMMC or microSD device. In one embodiment, mass storage (120) is a solid-state drive connected by a bus (114). Mass storage (112), (120) generally store additional programming instructions, data, and the like that typically are not in active use by the processor (102). It will be appreciated that the information retained within mass storage (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a communication interface (116), a touch (or physical) keyboard (104), and one or more auxiliary input/output devices (106) including an audio interface, a sound card, microphone, audio port, audio recording device, audio card, speakers, a touch (or pointing) device, and/or other subsystems as needed. Besides a touch screen and/or capacitive touch interface, the auxiliary device (106) can be a mouse, stylus, track ball, or tablet, and is useful for interacting with a graphical user interface.

The communication interface (116) allows processor (102) to be coupled to another computer, computer network, or telecommunications network using a network connection as shown. For example, through the communication interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system 100 to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor (102) through communication interface (116).

An auxiliary I/O device interface, not shown, can be used in conjunction with computer system 100. The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems may also be utilized.

Overview. As described above, complex monitored systems may have numerous sources of faults and even the mechanisms for monitoring such a system are subject to failures as well. For example, a temperature sensor monitoring a refrigeration system can fail, either permanently or intermittently, indicating incorrect temperatures for the system being monitored.

Component dependencies may introduce further complexity, for example, the cooling coils in a refrigeration system depend on correct operation of the compressor to provide condensed refrigerant. These dependencies arise from the interconnection of these components. As described above, the failure of one component may lead to another indicating a fault condition/symptom. Consequently, when one component has a fault, it may lead to cascading faults in the components that are dependent on the faulting component, making the task of determining the actual root cause fault difficult. In some cases, the root cause may not even be present among the alerts provided to the operator.

For example, if a cable fails between two computer network switches, there may be a flood of alerts from the switches at either end of the cable. However, there is typically no alert directly indicating the cable break because there are no sensors directly on the cable able to detect a cable breakage. A complex system may also be implemented in multiple layers, creating another set of dependencies. These layer dependencies are another source of alerts. For example, the above cable failure may cause the transport layer to indicate it has sessions timing out because no acknowledgements are being received. Similarly, a misconfiguration at the IP layer may cause alerts at the TCP/transport layer and routing layer to be generated.

Traditionally, these extra alerts are referred to as symptoms of the root cause fault. Generating a large number of these symptoms as alerts makes determining the actual root cause more difficult.

Traditional approaches attempting to use statistical correlation between faults assume that a strongly correlated fault is the root cause, but as noted above correlation may not indicate causation. A related statistical approach, using machine learning techniques to "recognize" different failure scenarios, requires a larger collection of labelled training sets be made available. Furthermore, these training sets are specific to particular configurations and deployments of a system so it is expensive and/or impractical to provide a sufficiently large training dataset for each deployment. Moreover, these approaches do not allow the knowledge of the system to be incorporated except possibly by extensive use of labelled training data. In particular, in engineered systems, the principles of operation, the dependencies between components and the potential root cause failures and their symptoms are generally known as part of the design process but not exploitable by the machine learning approach.

By using efficient matching of symptoms without requiring the use of statistical correlation between faults or impractical/costly large training datasets, an efficient way of encoding the principles of operation, the dependencies and causations, and the potential root causes that are known for an engineered system as a result of its engineered design is disclosed. This efficiency reduces storage costs and/or decreases power consumption for processors in order to determine root cause analysis. This efficient way allows root cause analysis to be performed automatically and efficiently.

Figure 2:
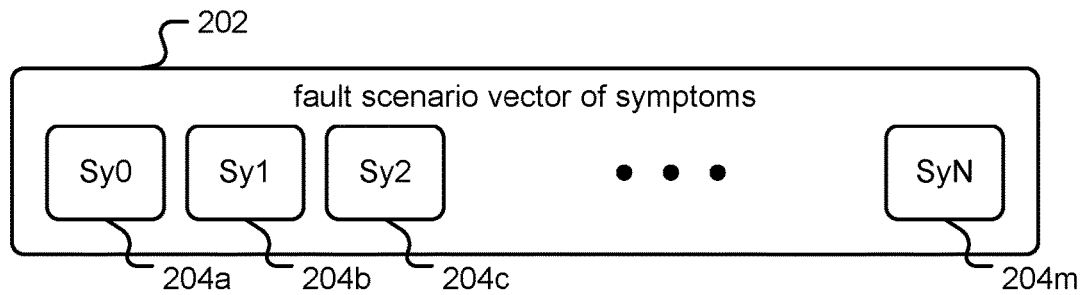
FIG. 2 is an illustration of a fault scenario vector of symptoms.

Symptoms and Fault Scenarios. FIG. 2 is an illustration of a fault scenario vector of symptoms. One example of a symptom, noPower, is a symptom indicating that there is no power coming to the monitored system. The state of a symptom may be a known value or a special indication that it is unknown and/or don't care. The term "don't care" is commonly used in digital logic to indicate that the associated item is extraneous/not required. The ability for the processing to indicate don't care for a given symptom allows analysis to proceed even when that aspect of the state of the system is not actually known.

A "fault scenario" is referred to herein as a collection of symptom values that indicates the known and unknown fault state of a monitored system. Logically a fault scenario represents the state and/or potential partial state of the system from the standpoint of observed/determined symptoms that something is wrong or not wrong with the system. It may not indicate the full state of the system. For example, with a vehicle, the fault scenario may not necessarily indicate the position, velocity, and so forth of the vehicle, only the state of the symptoms, that is, the aspects that are needed to perform root cause analysis of faults.

As shown in FIG. 2, in one embodiment, a fault scenario is represented as an array of values (202), where each entry (204a-m) corresponds to a specified symptom. For example, symptom Sy0 (204a) is a first entry, symptom Sy1 (204b) is a second entry, and so forth. In one embodiment, there may be multiple symptoms associated with the same metric. For example, there may be different symptoms for a temperature sensor being slightly high, moderately high, and extremely high. In one embodiment, there may be symptoms associated with the same metric based on different levels of derivative. For example, a symptom may be associated with a metric having a first derivative that is zero for too long, that is, it is constant, often indicating that the input sensor has failed. A symptom may be associated with the first derivative being too high, meaning that it is changing too quickly.

There may be additional symptoms associated with a metric that indicate that the metric is out-of-range or behaving incorrectly. In this case, the out-of-range symptom is set at the same time as a symptom indicating the metric is too high or too low, for instance. This "aggregate" form of symptom may allow a fault scenario to be specified in terms of "out of range," rather than having to cover both "too low" and "too high."

A match operator is defined between two fault scenarios s0 and s1 to return true
  bool isMatching=match(s0,s1);
if every symptom entry in s0 is either don't care or else matches as the value in the corresponding entry in s1. Note that the match operation is not commutative; match(a,b) may not necessarily be equal to match(b,a).

Figure 3:
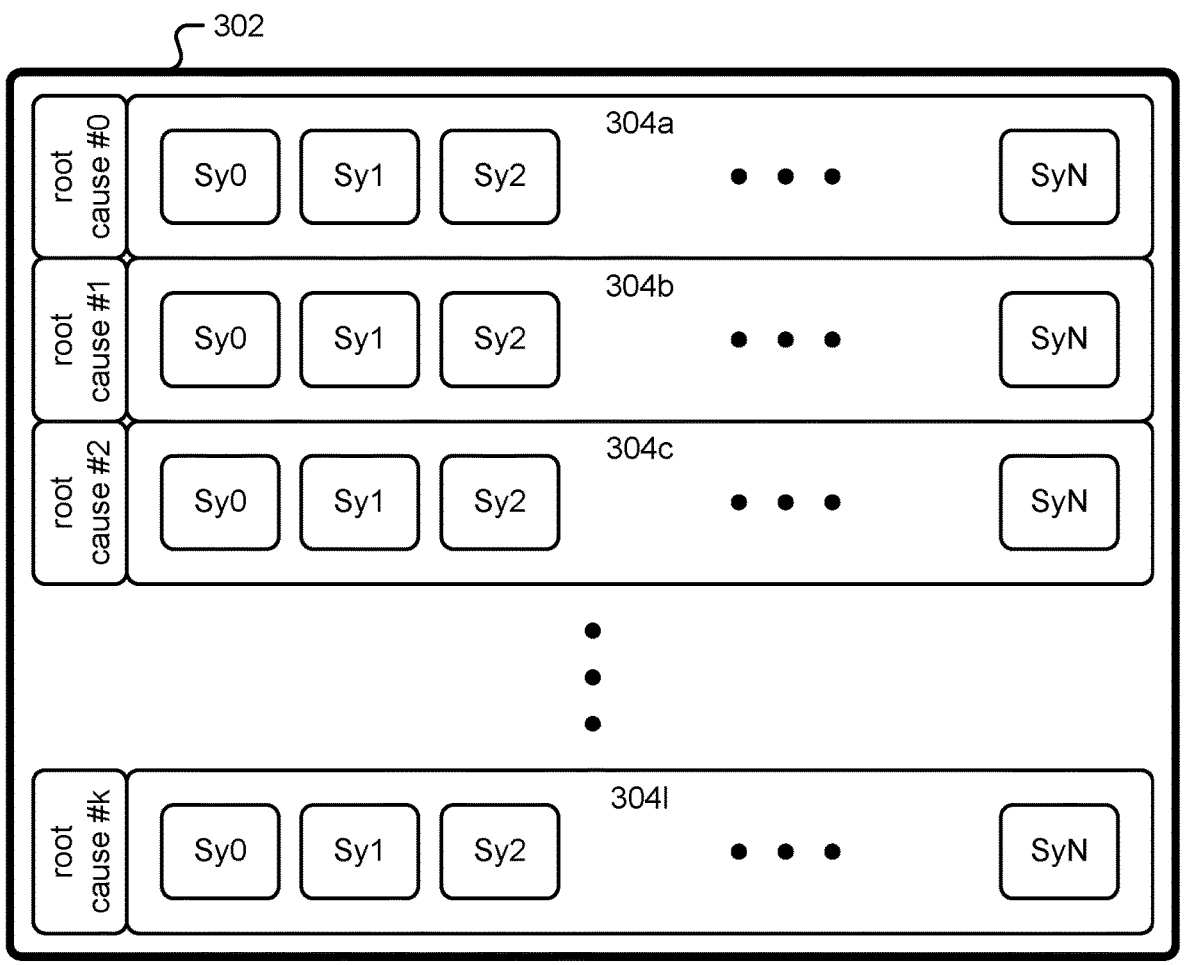
FIG. 3 is an illustration of a root cause table (RCT).

Root Cause Table. FIG. 3 is an illustration of a root cause table (RCT). An RCT is a table in which each row is a fault scenario that is labeled with an associated root cause. In this context, an unknown value for symptom in such a fault scenario is interpreted as don't care. For example, for a root cause "bad motor," symptoms in the row may be: noPower as false, motorNotRunning as true, and all other symptoms indicated as don't care.

In one embodiment, an RCT contains a row for every failure or event that can be the root cause, where each row indicates the symptoms that must be true for this to be the root cause, those that must be false, and the rest set as indicating don't care. Note that specifying more symptoms as specific values, rather than don't care beyond the absolute minimal for a given root cause can result in a root cause not being identified or matched because extra symptoms may not be known or are the opposite of that specified for the row. Consequently, it is important to specify the minimal set of known symptoms required to diagnose the system to the particular root cause associated with the row in the table. If a given root cause may have multiple identifying sets of symptoms, there are multiple rows in the RCT, as a row per set. A given root cause may have multiple corresponding rows because one row corresponds to a minimal set of symptoms and others correspond to the minimal set with additional symptoms that provide greater confidence in the root cause. For example, in the case of a power supply failure to a switch, the minimal set may just contain the "lossOfPower" symptom from the switch's current sensor while additional rows may contain that symptom plus "lossOfSignal" symptoms from the directly attached switches to the failed switch.

In one embodiment, each RCT row is represented in the same way as a fault scenario. As such, it may be referred to herein as a "potential fault scenario." As shown in FIG. 3, an RCT (302) comprises k+1 rows (304a-304l), each row associated with a specific root cause with N symptoms per row. For example, root cause #0 is associated with the first row (304a). The values of the symptoms (204a-m) in each row (304a) are different from the other rows (304b-304l), each corresponding to a potential fault scenario for the associated root cause, as indicated by the root cause labeled #0 through #k.

In contrast to a potential fault scenario, the fault scenario determined from a monitored system is referred to herein as an "actual fault scenario." There may be multiple actual fault scenarios for a monitored system. One actual fault scenario may be a more detailed fault scenario for a particular subsystem compared to another. Another source of multiple actual fault scenarios is uncertainty regarding the faults. For example, one scenario may have a symptom corresponding to the temperature of the system being too low whereas another may have a symptom indicating that the temperature sensor has failed. In the latter case, it may indicate the temperature sensor-dependent symptoms as unknown.

In one embodiment, ternary symptom values are used so that a symptom is represented as a "known" bit indicating known or unknown by being true or false respectively, and a second "value" bit that indicates true or false, which is only interpreted as such if the known bit is set to true. A quaternary nomenclature is referred to herein of [a, b] wherein a is whether a state is known (0=unknown, 1=known) and b is a value associated with the state (0=false, 1=true). With this convention, an interpretation of [0,1] that is allowable is that an associated symptom is not known to be true: Compare [0,0] which may correspond to unknown with [0,1] which may be interpreted as not known to be true. Note that a [0,1] symptom in an entry in an RCT may match to an input being false or unknown unlike [0,0], which just does not match to true. Thus [0,1] may not necessarily be treated the same as [0,0] and/or not allowed.

Figure 4:
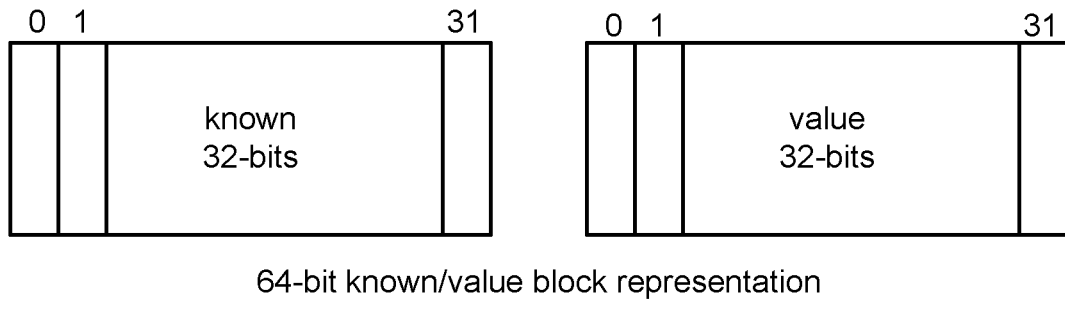
FIG. 4 is an illustration of a 64-bit block representation of known and value bits.

FIG. 4 is an illustration of a 64-bit block representation of known and value bits. In one embodiment, a fault scenario is represented as blocks of bits that are partitioned into a sequence of "known" bits and a sequence of value bits. For example as shown in FIG. 4, an implementation uses 64-bit blocks, wherein the first 32 bits are "known" bits and the second 32-bits are value bits. Referring to FIG. 4, if the i-th known bit is 1, the i-th value bit indicates if the corresponding symptom is true or false; otherwise the actual value is not known and the i-th value bit is not meaningful. This embodiment allows efficient determination of the "known" bits in a block. It also means that a block need not be stored if all the symptoms in a block are unknown or don't care. That is, absence of an explicit storage of a block is interpreted as that block containing only "don't care" values.

Figure 5A:
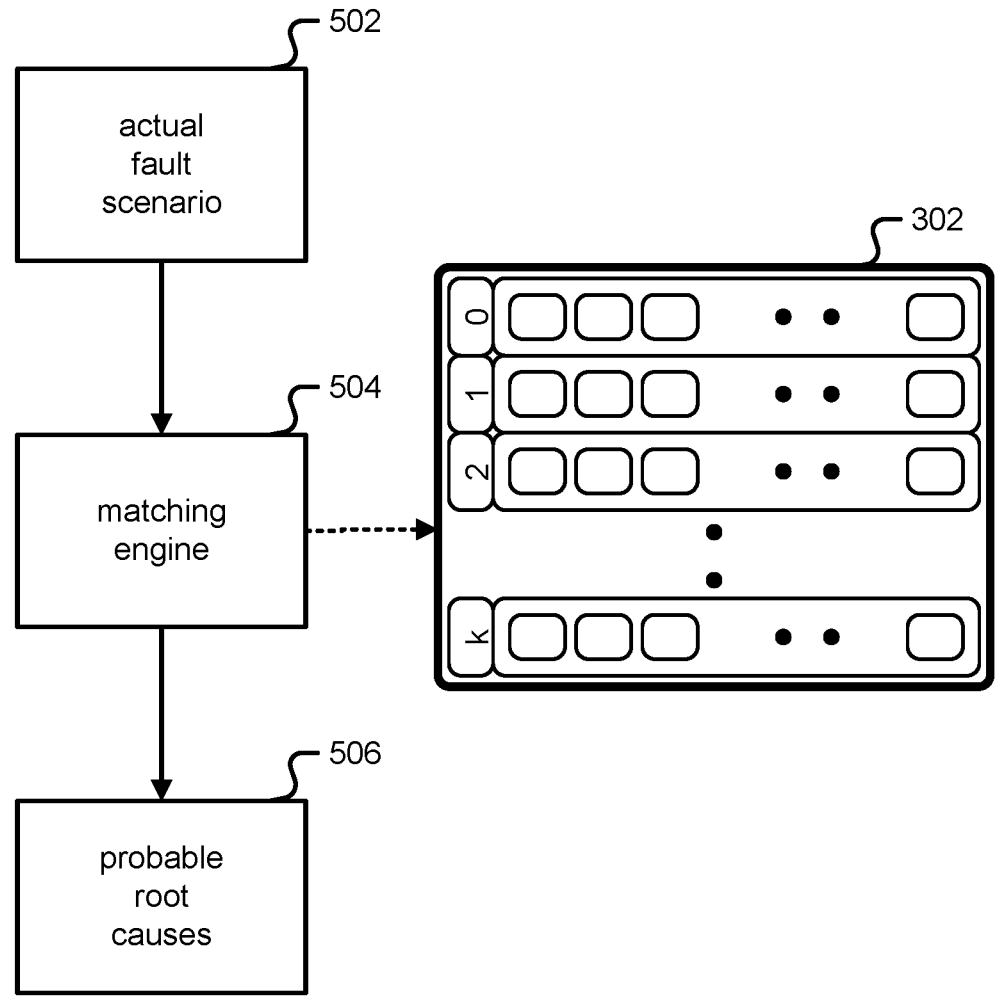
FIG. 5A is an illustration of a root cause analysis technique.

Root Cause Analysis. FIG. 5A is an illustration of a root cause analysis technique. Actual root causes associated with a given actual fault scenario (502) are determined by using a matching engine (504) to match the given actual fault scenario against each row in the RCT (302), and indicating the ones that match as probable root causes. That is, if a fault scenario matches a row such that each entry matches by the above match(a,b) operator, the root cause associated with that row is output as a probable root cause (506) associated with this symptom, as shown in FIG. 5A.

This matching is essentially "ternary matching" but unlike the ternary matching provided by a ternary content-addressable memory (T-CAM), the input fault scenario is also ternary. A T-CAM may however be used as part of an efficient/hardware system of matching. There may be multiple simultaneous root cause failures in a monitored system. Therefore, it is possible that the matching matches multiple rows in the RCT, one per root cause. For example, a motor may fail at the same time that a temperature sensor has failed by indicating completely unrealistic readings. There may be multiple rows that map to the same root cause. This handles the case in which a root cause failure may be indicated by different sets of symptoms.

In one embodiment, the row representation does not explicitly store the don't care entries. That is, the absence of an explicit designation or representation of an i-th symptom is interpreted as don't care for the i-th symptom. In one embodiment, symptoms are aggregated into blocks that are associated with logical units or components of a monitored system. For example, an embodiment may use the 64-bit block of known/value bits described earlier. Thus, if a component is not relevant to a particular root cause, the entire block need not be stored. Each row may then require a relatively small amount of storage. Typically, most rows are relatively sparse because only a small subset of symptoms are relevant to a particular fault so only a small percentage of that row is actually stored, with the rest by default being don't care.

The representation of arbitrary fault criteria is achieved by using multiple symptoms. For example, one root cause is evidenced by a temperature being very high, yet another is evidenced by it being high, and another evidenced by it being slightly high. That is, there may be a symptom entry in each row for each of these levels.

A key element is indicating the symptoms that are known to be false as a symptom, that is no fault, as well as what is known to be true, that is a fault is present, while still allowing for unknown or don't care. The false case effectively filters out symptoms that are due to another reason, for example the compressor is not working, but actually there is no power, which is the root cause. Thus, a subsystem SSi that is dependent on a number of other subsystems may need to have all these other systems known to be working before a fault in subsystem SSi may be reliably identified as a root cause.

In one embodiment, the system may record if any symptoms changed in an actual fault scenario since its last matching and only re-match the actual fault scenario to the RCT (302) if so. This check avoids the overhead of re-matching when there is no change to the actual fault scenario.

In one embodiment, the frequency of re-matching is configurable according to application requirements. For example, automatic root cause analysis (ARCA) matching may be configured to be performed every 30 minutes in a refrigeration system to minimize the cost of the matching because a fault does not result in immediate problems and the resulting delay in detecting a fault does not significantly impact the meantime to repair. This low rate of matching assumes that a fault that is transient enough to appear and then disappear before the matching takes place, and thus is not present in the actual fault scenario at the time of the matching is not critical to detect.

Figure 5B:
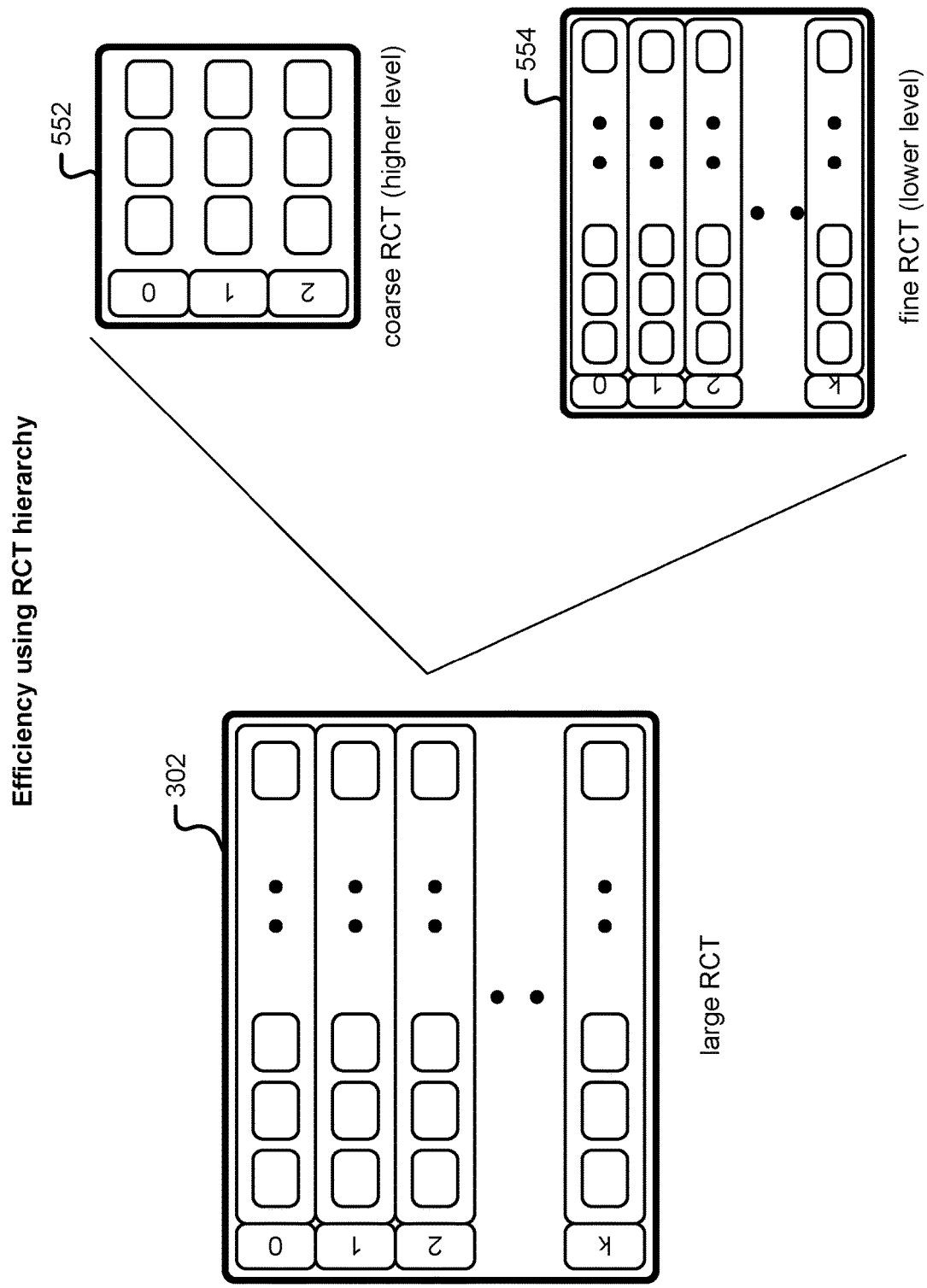
FIG. 5B is an illustration of RCT Hierarchy.

RCT Hierarchy. FIG. 5B is an illustration of RCT Hierarchy. In one embodiment, there may be a hierarchy of RCTs corresponding to different levels of root cause analysis. For example, a refrigeration system RCT (302) may be partitioned such that it has a top-level RCT (552) that "root causes" the high-level reason that the system is not performing well, which could be one of: 1) not maintaining desired temperature, and 2) consuming excessive energy. Once this top-level RCT (552) indicates one of these causes, a next level of monitoring and corresponding RCT (554) may be automatically deployed, depending on the specific cause, to provide a more specific root cause for the top-level root cause. For example, if the top-level root cause for not performing well is excessive energy consumption, additional telemetry and analysis can be deployed to detect the symptoms of low coolant, icing on the coolant coils, supercycling of the compressor, failure of the current sensor, and other possible root causes of the excessive energy consumption. This next level root cause may be sufficient to indicate the necessary repair to the system. Alternatively, a next level of RCT (554) and processing can be automatically dispatched based on the root cause determined at this second level.

This hierarchical processing may reduce the resources consumed by root cause analysis in the case in which the system is operating normally. It also may reduce the resources required to root cause a specific failure if the next level of root cause analysis only needs to handle a subset of possible symptoms based on the indication of the root cause at the higher level. For example, using the above case of a refrigeration system, knowing that the problem with the system is excessive power consumption, the next level root cause analysis processing that is actually deployed may require a smaller RCT (554) and less telemetry and processing compared to this level of root cause analysis that is configured to detect both failure to maintain configured temperature as well as excessive power consumption. Alternately, if both top-level symptoms are arising, there may be no such savings. However, it is feasible to run the two instances of this detailed root cause analysis in parallel as separate processes, which is time efficient.

Generally, the root cause analysis matching may be performed in parallel by partitioning the RCT across multiple parallel threads and collecting the output of each. Because the matching does not modify the actual fault scenario or the RCT and because the matching is order-independent across the rows, the only synchronization required between the threads is on the output to the aggregated root cause set.

Multi-layer, partitioning and this hierarchal approach reduces the size of the RCT significantly. For example, in a network application if a higher-level RCT such as basic connectivity only considers four symptoms per node of a network rather than 256, the RCT may be reduced in size by a factor of almost 64. The size may be further reduced by only having coarse-grained root causes in the basic RCT. For instead, a large number of specific problems for a link may be handled at this level by a simple "link-problem" as the root cause, which when identified may cause the dispatch of a more detailed ARCA using the full set of possible specific link issues.

Besides reducing the size of the RCT that needs to be actively accessed in the common case in which there are no faults, this smaller RCT is more efficient to process. Also, with sufficient reduction in size, the fault scenario vector may potentially fit into a hardware T-CAM so that matching may be done in hardware. In one embodiment, where there are multiple similar independent units to root cause, such as with multiple roof-top-units (RTU) in the case of an HVAC application, a single RTU RCT may be used to pass a fault scenario vector for each separate RTU into the T-CAM in sequence, to detect faults in each RTU.

A benefit of such a hierarchical approach is that the basic ARCA is expected to be the common case, namely when the equipment is performing correctly, so the T-CAM may be very efficiently handling the common case, and the detailed ARCA may be reserved for when there is actually a problem. Another benefit is that the more basic ARCA allowed by the hierarchical approach may mean that less telemetry is being collected when there are no faults, which again may be the common case. Thus, a hardware implementation, for example using a T-CAM or equivalent, which may currently be realized using SRAM, is practical and attractive in some applications.

Figure 6:
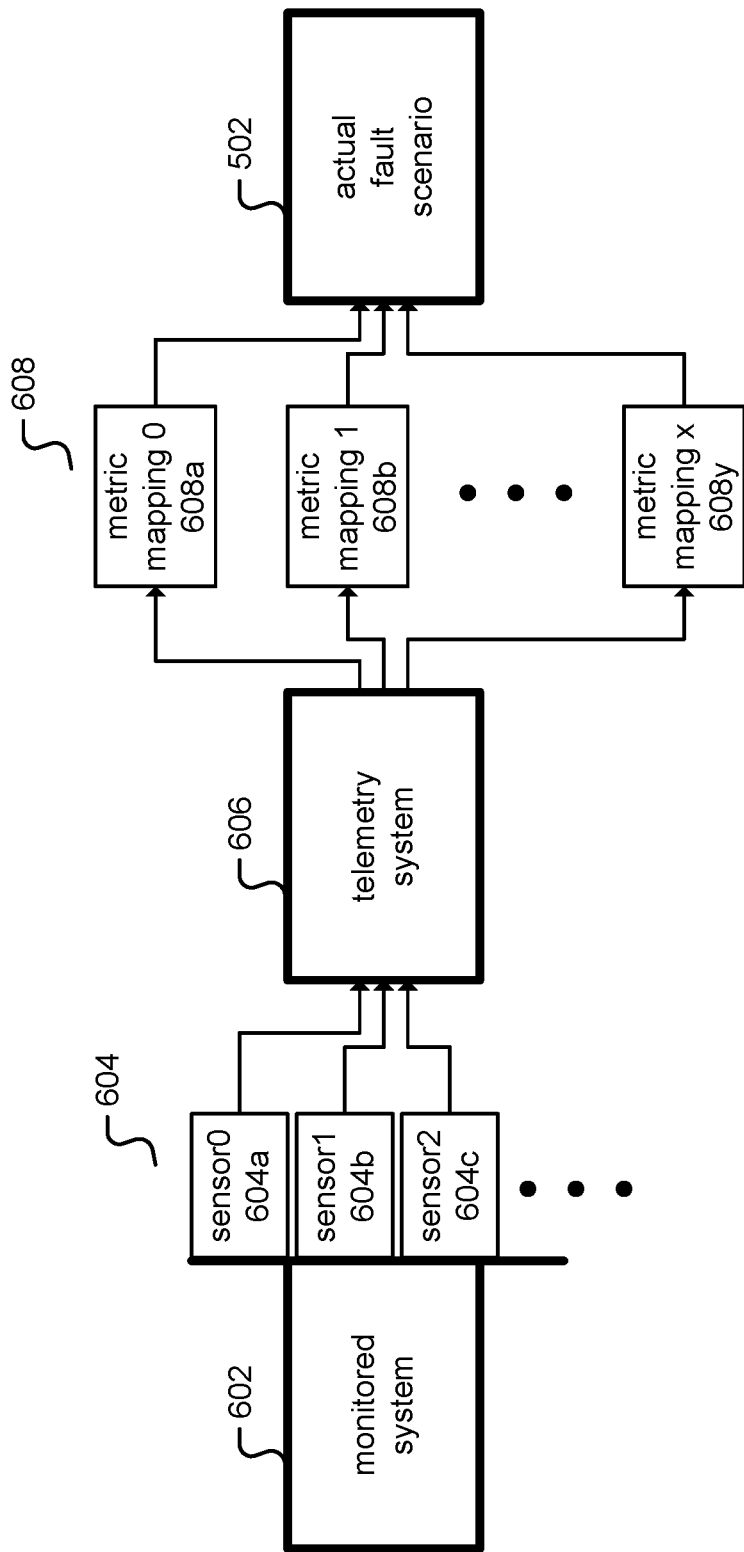
FIG. 6 is a block diagram illustrating an embodiment of a monitored system.

Mapping Metrics to the Actual Fault Scenario. FIG. 6 is a block diagram illustrating an embodiment of a monitored system. Monitored system (602) is coupled to sensors (604) including sensor0 (604a), sensor1 (604b), sensor2 (604c), and so forth. A "telemetry system" (606) periodically collects various metrics from the system-under-diagnosis or monitored system (602) via the sensors (604). For example, by connecting to a temperature sensor (604) on a monitored system (602), the telemetry system (606) may repeatedly poll this sensor to produce a time series of temperature readings. A metric mapping (608) is a means of mapping these metrics onto an actual fault scenario (502). There are a plurality of metric mappings, for example metric mapping 0 (608a), metric mapping 1 (608b), and so forth (608y). Each metric mapping (608) takes as input a time-stamped sequence of values for one or more metrics and maps these values onto zero or more symptoms in the actual fault scenario (502).

As shown in the figure, this is a mapping from the monitored system (602) through sensors (604) to the telemetry system (606) which then provides values to the associated metric mappings (608), which then update an actual fault scenario (502).

In one embodiment, a time series stream of readings for a given metric may be mapped into symptoms based on specified threshold values and associated symptoms. For example, if the temperature (604) is over one specified threshold value, the mapping (608) causes the "temperature/slightlyHigh" symptom (e.g., 204a-m) to be set to true in the actual fault scenario (502). If this value (604) is over another even higher threshold, the mapping (608) causes the "temperature/veryHigh" symptom (e.g., 204a-m) to be set to true in the actual fault scenario (502). In both cases, the same mapping (608) may also set the "temperature/outOfRange" symptom (e.g., 204a-m).

In one embodiment, this mapping (608) is performed periodically, driven by a configurable clock period. For example, the system may evaluate some or all of the threshold mappings (608) against their associated metrics every 5 seconds.

In one embodiment, a metric may indicate if its value (604) has changed since a previous clock period. In this case, the mappings (608) associated with a metric are only re-evaluated on the next period for metrics that have changed since the previous period.

In one embodiment, the mappings (608) for a metric are evaluated in direct response to a change in the associated metric (604). However, in some situations, a metric may be changing rapidly and responding to each change by a re-evaluation may be expensive. An important design consideration in systems and applications is being able to bound the computing resource demands of monitoring and analysis of a system, under different conditions, in particular during times of stress and failure, when extra resource demands may lead to further failures. The metric mapping (608) may also set symptoms based on derivatives of the associated metric. For example, a mapping may set a "temperature/SensorFailure" symptom if the first derivative of the metric is zero, that is the value is constant, for an excessive period of time.

In one embodiment, mechanisms are configured to modify the thresholds and other parameter values used in the metric mappings (608). For example, a metric mapping (608) may provide thresholds that are parameterized in terms of the load on the system, recognizing that a metric may legitimately be at a higher value when the system is under significant load.

In contrast to traditional manual root cause analysis which performs complex and often application-specific comparisons as part of its analysis, forcing the evaluation of metrics against thresholds is disclosed. This forced evaluation of metrics takes place as part of metric mapping to the actual fault scenario (502), allowing the symptoms in the fault scenarios to be represented as simple ternary values/vectors. Consequently, the root cause analysis portion of matching the actual fault scenario against the collection of potential fault scenarios in the RCT is application-independent. This allows a compact representation that enables efficient fault scenario matching for efficient ARCA.

Directly Reported Metrics vs Computed Metrics. Some metrics are directly reported by sensors (604) or monitors on a monitored system (602). For example, a network switch may report the packet transmit count per interface over the last time interval. However, other metrics may need to be computed from directly reported metrics (604). For example, one metric may be the standard deviation of the transmit packet rate on a given interface compared to the average across all the other interfaces. Both computed metrics and directly reported metrics may be used in the metric mapping process (608) to an actual fault scenario.

Other Application Domains. The disclosed may be applied to application domains besides the complex engineered system with sufficient understanding of the operating principles and dependencies of the system and adequate quantitative telemetry.

For example, medicine has developed an extensive body of knowledge about how the human body works, the dependencies, the potential faults, and the resulting symptoms. Although the body is not engineered per se, it does operate on physical principles that are somewhat understood. Moreover, monitoring technologies are improving to provide on-going and more detailed monitoring of the body even outside of a hospital setting. For example, some "smart watches" may sense body temperature, heart rate, blood pressure and other aspects of the body operation. With these improvements, the techniques and/or system of FIG. 6 may be configured and deployed to provide rapid root cause analysis of human body faults.

In some cases, diagnosis is dependent on X-rays and CAT scans that effectively require image processing. In these cases, automatic and/or mechanical interpretation of an image via image processing may be used to compute metrics/symptoms to fuse with fault information and other inputs to perform root cause analysis.

Another area of application is to detect intrusion detection in systems. In some cases, an RCT may be constructed based on knowledge of intruder exploits and what the resulting symptoms are that may arise from said exploits. This analysis in turn may drive the requirement for telemetry. For example, telemetry may indicate the size of system logs and the log rotation behavior and thereby detect when an intruder attempts to mask its presence by truncation or replacing an existing system log. In this domain, intruders may also attempt to disrupt the telemetry system, but this is handled as essential sensor failure, similar to what was described earlier, based on the assumption that it would not be feasible for an intruder to disrupt enough of the telemetry system quickly enough to avoid detection.

Leveraging related technology. Ternary values have been used in circuit logic, where for example, a state transition function may specify its inputs as true, false and don't care. Circuit logic is not the same as root cause analysis: the don't care in circuit logic is effectively a means of compacting the specification as compared to specifying a table row for both values but with the same output, and the inputs are always known. Similarly, T-CAM has been used for ternary matching, where a T-CAM field may be specified as don't care, again as a means of compacting the number of entries required, as compared to specifying each possible combination of values in root cause analysis.

The database language SQL has a NULL value that is treated as unknown, but databases do not support automatic root cause analysis directly.

Traditionally, decision trees have been used as a means to perform root cause analysis. However, a decision tree in computing is simply a nested collection of if-then-else statements. Unlike what is disclosed herein, these traditional techniques do not necessarily have a standard or system-wide starting condition to evaluate. Also, given there may be multiple root cause failures at the same time, there may not necessarily be a single path to follow through a decision tree. As well, given some conditions or variables may be unknown, it is not clear how to structure the sequence when it is possible for execution to encounter a condition in the decision tree that is in terms of some unknown value. One other difference with decision trees is that its inherent if-then-else structure may become unreasonably complex for realistic systems, and thus very expensive and difficult to maintain and extend.

Traditionally, some approaches are rule-based. A rule in computing is normally characterized as a condition and an action, wherein the action in the case of ARCA is to report the root cause or else evaluate yet another condition. Therefore, a rule-based system is essentially equivalent to an if-then-else approach with all the differences described above. Unlike what is disclosed herein, there may be and there commonly is significant overlap in the expressions of different rules such that it may inadvertently cause a significant amount of redundant computation and re-computation unless the rule execution engine is sophisticated enough to detect and extract common subexpressions. By contrast, using what is disclosed herein, evaluation may be done once per time/instance interval to map into the actual fault scenario, with matching performed once per row of the RCT.

Traditionally, some approaches discover statistical correlations, for example if CPU load goes up at the same time as various other symptoms occur, the CPU load is assumed to be the root cause. This interprets correlation as causation, which is often not valid. For instance, the two faults may just be symptoms of a fault in some component that two different modules depend on.

Traditionally, some approaches focus on anomaly detection. Under this approach, an event that occurs with low probability may be assumed to be a problem. However, this may not necessarily indicate a fault. As well, it is not necessarily the root cause even if it is a fault. Also, the root cause may not actually be directly or indirectly observable, such as the case of a cable break between two network interfaces. Unlike what is disclosed herein, the root cause may not be able to be detected by simply intelligently selecting from among reported anomalies.

Example Use Case: General Tutorial. Software called Fault Scenario Diagnosis (FSD) that uses ARCA with ternary fault scenario representation is disclosed as an example use case in the form of a tutorial, without limitation.

Introduction. The FSD software may be packaged as an agent that reacts to inputs from either data files or mounts reflecting the state of a system under diagnosis (SUD); it may provide root cause analysis of faults in this SUD. It may perform this root cause analysis according to a configured RCT and set of symptoms, and a configured mapping of the data inputs onto this RCT.

It may output multiple root causes if there are multiple root cause failures present at the same time. For example, a refrigeration system may be suffering from both a coolant leak and short cycling of the compressor. It outputs no root causes when there are no symptoms present. It avoids reporting a fault that is not a root cause, but caused by other faults, effectively suppressing these as false positives. It may be configured in many applications to also detect when one or more of the sensors themselves may have failed. For example, if the refrigeration temperature is not reading the desired temperature, either the temperature sensor has failed or the refrigeration system itself is not working correctly, or both. FSD may be configured to use the compressor temperatures and pressures to differentiate these cases.

The FSD "philosophy" is to encourage the design-in of telemetry to enable fast root cause analysis when something goes wrong, which may happen in production. FSD encourages an application to be developed with telemetry that supports this ARCA, rather than burdening the code with a lot of error reporting that can only be handled manually, and may result in lots of false positives relative to root cause failures because the outputting module does not have the "big picture" of what is going on. It also encourages the explicit development/design of the dependency model for components as part of the application design, as required for ARCA. By contrast, applications and systems are often designed with little thought as to the effect of one fault on other parts of the system. With FSD, with a root cause analysis/dependency model, a designer may focus on providing the telemetry that is required, avoiding the execution burden of trying to report "everything" because it is not known what is needed.

FSD is based at least in part on ternary elemental fault scenario matching. A fault scenario is the state of symptoms or non-symptoms or not-known for the SUD. Here, "elemental" refers to herein as a symptom specified in a most basic form, namely a symptom that is either true or false. This is opposed to specifying it as some value relative to a threshold or other similar complex representation. As described above, ternary means that a symptom can be specified as true or false or unknown. Unknown may be interpreted as don't care in some contexts. FSD determines the SUD fault scenario from its input data and then matches this actual fault scenario against a collection of fault scenarios constituting the RCT, each corresponding to a root cause.

This tutorial describes the use of FSD, structured and explained below in terms of the JSON-based configuration used by FSD. The FSD JSON configuration is specified as four different configuration files:
1. Symptom and Root Cause Table config file;
2. Indicator file;
3. Indicator Mapping file; and
4. Input Binding file.

Symptoms. As described above, a symptom is a condition or state in the SUD that is required to disambiguate between different root cause failures. It is normally a condition that is not considered normal or acceptable. For example, the current consumption being higher than expected is such a symptom.

The set of symptoms for the SUD is defined in the first section of the RCT JSON file. A separate specific symptom may be defined for each component of each device in the SUD. For example, in a network of 100 switches, each with 32 interfaces, there may be a separate symptom defined for CRC errors for each of these interfaces, i.e., 3200 specific symptoms. Also, there may be a separate symptom for each level of CRC errors of interest, namely low rate of errors, medium, and high rate of errors. Thus, in a realistic network, there may be thousands or more than thousands of symptoms to be defined.

If a system under diagnosis comprises several independent but identical subsystems, there may be a single RCT for these subsystems and the actual fault scenario specific to each of these subsystems may be matched to the RCT, either in parallel or sequentially. For example, a building may have multiple RTUs that are independent and/or identical from the standpoint of root cause analysis. In this case, the FSD may generate an actual fault scenario for each of the RTUs and match each of these against the same RCT. By contrast, in a computer network, the switches as subsystems are not independent, but have failures that require information on the other end of each connection for accurate RCA. Therefore, it may not be feasible to diagnose these as individual separate subsystems.

In FSD, a specific symptom may be defined as a named index into a column of the RCT. To support a large number of symptoms, one better practice is to follow the naming conventions outlined below:

Symptom Naming Conventions.

A symptom name may be structured as:
  unitName/componentName/metric/issue

For example, for compressor0 in roof-top unit 14, the electrical current consumption being high may be designated as:
  rtu14/compressor/current/high Similarly, frequent link CRC errors on interface eth4 on switch 17 may be designated as:
  switch17/eth4/link/frequentCRCerrors For "occasional" CRC errors, for selected notions of frequent and occasional, the symptom may be:
  switch17/eth4/link/occasionalCRCerrors JSON Specification of Symptoms. FSD may support a structured specification of symptoms as an efficient means of defining the thousands of symptoms. This structured specification may encourage a uniform naming of symptoms across different components and units.

The basic structure model is:
  metric type that may define one or more associated symptoms. For example, a "current" metric may define the symptoms: too low, too high or too constant, wherein too constant may possibly suggest a sensor failure. Each of these values may be set as specified offset, starting at 0;

component type that may define a list of metrics, each of which is defined as a metric type, which can take on any of the symptom values associated with that metric type; and/or unit type that may define a collection of the constitute components, each being an instantiation of a component type.

More specifically, the JSON RCT file format is as follows:

metricType—a collection that may define a set of relative index values and base symptom names to be used in the instantiation of components of the SUD. For example, a temperature metric may have the symptoms of low, high, and constant, wherein if it is unchanging over time, it may indicate a problem;

componentType—may define a collection of Component-Type's that each define a collection of metrics;

unitType—may define a collection of UnitType's that each define a collection of components; and/or unit—may define a collection of units, each an instantiation of a UnitType.

FSD may expand this description into a collection of specific symptoms, each with its own hierarchical name and offset into the RCT columns. For example, for a unit called "foo" with a component called "bar" that has a metric called "bazz" and an issue or symptom called "blat," the specific symptom is called "foo/bar/bazz/blat." The offset of this symptom may then be the symptom offset defined in the metric type, relative to the symptom block for this unit, where each metric is put in a separate block. In one example of FSD, each block may hold up to 32 symptoms. There is normally no reason to know the offset for a symptom because a symptom is referred to by its hierarchical string name.

The following is an example of two MetricType's in JSON RCT file:

```
{
    "metricType" : {
        ...
        "Generic" : {
            "offset" : {
                "0" : "constantReading",
                "1" : "low",
                "2" : "high"
            }
        },
        "Current" : {
            "offset" : {
                "0" : "constantReading",
                "1" : "veryLow",
                "2" : "low",
                "3" : "high",
                "4" : "veryHigh"
            },
            ...
        },
        ...
    }
}
```

The first " . . . " indicates that there may be additional metric types defined. The second " . . . " indicates that there may be more to define in this JSON file. This example defines a "Generic" metric type as well as "Current" metric type. The "Generic" metric type is defined as having four symptoms, at relative offsets 0 through 2, corresponding to too low, too high, and a too constant reading.

The constantReading corresponds to the fault where the current sensor itself is reading the same value for too long a period of time, likely because it is disconnected or has failed. The "Current" metric type defines an expanded set of 5 symptoms.

Any number of values may be defined as associated with a metric. If a metric has more than a set number, for example 32 values, it may consume more than one block. FSD may be configured to detect and report offset conflicts when they do arise from the configuration state.

The following is an example of a componentType definition in an FSD JSON RCT configuration file.

```
componentType" : {
    "Compressor" : {
        "metric" : {
            "current" : {
                "metricTypeName" : "Current"
            },
            "pressure" : {
                "metricTypeName" : "Generic"
            },
            "superheat" : {
                "metricTypeName" : "Generic"
            },
            "subcooling" : {
                "metricTypeName" : "Generic"
            },
            "runtime" : {
                "metricTypeName" : "Generic"
            }
        }
        ...
    },
    ...
}
...
```

This JSON defines a component type called Compressor which has a metric called current which is of metric type Current, so has symptoms corresponding to those of the metric, namely veryLow, low, high, veryHigh and constantReading. It also defines metrics for pressure, superheat, subcooling, and runtime, using the Generic metric type.

Additional metrics for Compressor may be defined at the first " . . . ". Additional component types may be defined by inserting more definitions at the second " . . . ". The third " . . . " allows for more further specification in the JSON file.

A unitType definition is illustrated below:

```
"unitType" : {
    "RooftopUnit" : {
        "metric" : {
            "power" : {
                "metricTypeName" : "Generic"
            }
        },
        "component" : {
            "compressor0" : {
                "typeName" : "Compressor"
            },
            "compressor1" : {
                "typeName" : "Compressor"
            },
            ...
        }
    }
}
...
```

This defines a "RooftopUnit" unitType which has two components, "compressor0" and "compressor1." It also illustrates that metrics may be defined directly as part of the unitType, such as the "power" metric in this case.

Specific units may be defined as follows:

```
"unit" : {
    "rtu0" : {
        "typeName" : "RooftopUnit"
    },
    "rtu1" : {
        "typeName" : "RooftopUnit"
    },
    ...
}
```

The above defines two units, namely "rtu0" and "rtu1" which are instantiations of the "RooftopUnit" unit type.

One result of the instantiation of rtu0 is that a large number of symptoms are defined. For instance: "rtu0/compressor0/current/veryLow," "rtu0/compressor0/current/Low," "rtu0/compressor0/current/high," "rtu0/compressor0/current/veryHigh," and similarly for the other metrics of "rtu0," and similarly for compressor1. The symptoms for rtu0 power are: "rtu0/power/low," and so on. The symptoms for "rtu0" start at column/offset 32 because the symptoms are assigned to blocks starting from 1. There is no significance to the offset for a symptom. It should be unique, that is, not the same as that of any other symptom.

A similar set of symptoms is generated for "rtu1," with the starting offset being 256, based on the starting block being 8.

In general, the structured specification of symptoms allows many thousands of symptoms required for an SUD to be specified in far fewer lines of JSON.

There is generally no need to know or compute the symptom offsets. It is only necessary to be able to determine a symptom name that is generated from the definition of a unit, in terms of unit type, in terms of components defined in terms of component types, defined in terms of metric types.

General vs. Deployment-Specific Symptoms. There may be metric, component, and unit types that are common across multiple deployments as well as ones that are unique to a particular deployment or configuration. Both are defined in the same JSON RCT file to allow efficient initialization of FSD, compared to the burden of having another separate file. One assumption is that the FSD files are generated by a separate program which may work from higher-level files that separate these into more categories and files. For example, in applying FSD to networking, a separate program may deal with generating symptoms and RCT for a given network topology.

Root Causes. A root cause may be defined as a condition that is logically the source or cause of various symptoms. That is, remedying this condition would cure these associated symptoms. Conversely, in some cases there is not another condition that may reasonably be remedied to remove the associated symptoms.

The root cause may be contained within the context or perspective defined by the SUD, rather than necessarily being some elemental root cause. For example, the root cause of a compressor not working may be identified as lack of power, without necessarily delving into exactly why it has no power. From a power systems perspective, the lack of power is a symptom whose root cause may be a power cable break, generator failure, transformer failure, and so forth, but these are beyond the scope of the refrigeration system as the SUD.

There are various categories of root causes:

Directly Observed Root Cause Metrics. There may be root causes that directly correspond to the value of some sensor's input. For example, a current sensor could report no current to a compressor, directly corresponding to a power failure root cause for the compressor. An even more direct form may be getting an input that indicates no current.

In this case, FSD may serve to suppress the other symptoms that arise as symptoms of this root cause, such as no cooling taking place, thus only reporting the actual root cause. The other aspect FSD may handle is sensor failures in these cases. For example, the compressor current sensor may be reporting no current yet other sensors may report that the refrigeration is taking place normally. In this case, FSD may suppress "no power" as the root cause and infers the root case as a current sensor failure instead. For example, if a root cause fault scenario associated with power failure requires that the dependent symptoms also be true, this fault scenario does not match when it is the current sensor that has failed.

There may be limits on the diagnosability when there are multiple simultaneous failures. For example, if the sensors on the current and on the rest of the cooling system have failed, FSD may have inadequate data on the SUD to perform a diagnosis beyond indicating that either the sensors have failed or the SUD has failed or both.

Computationally Determined Root Cause Metrics. Some root causes may be determined from metrics that need to be computed from the directly observed data. For example, supercycling of a compressor is determined by computing the duration or period between the start of the compressor and its next start time. Similarly, congestion in a network is indicated by the average bandwidth over time, not the instantaneous packet rate at a given time, as may be reported by a network device. FSD may provide a means to compute various metrics from the base input metrics to detect these symptoms.

Inferred Root Causes. There may be root causes that may not be determined from either directly observed or computed metrics, but may be inferred. For example, in a network, if both ends of a link are reported up and properly configured yet are unable to communicate, FSD may infer that the cable between them is unplugged or defective even though there is no cable sensor. It is possible this inference is wrong. For instance, it is possible that both interfaces have actually failed and the cable is fine. However, this may be a relatively low probability event compared to it being a cable problem.

This case is similar to the case of a failed sensor in the sense that FSD may be inferring the value of the sensor. Whether the sensor has failed or simply not present, the handling primarily differs in whether FSD is configured to override the sensor input or just infer it. In the latter case, it is normally inferring the symptom and then actually inferring a metric and then using a threshold to map it to a symptom.

For these root causes, FSD may perform reverse inference, by a fault scenario for the row caused by a set of symptoms, often symptoms that are known to be false, which are most likely explained by the associated root cause.

Root Cause Table (RCT) Each row of the RCT may correspond to a probable root cause, identified by its name. The row may be a potential fault scenario represented as a named array of symptoms, each of which is either true, false, or don't care. A symptom in the row that is indicated as true indicates a symptom that must be true for this row to be matched. A symptom in the row that is indicated as false indicates a symptom that must be false for this row to be matched. If a symptom in the row is indicated as don't care, the probable root cause associated with this row may be independent of this symptom.

In a system with many units, the RCT may have thousands of rows corresponding to the numerous root cause failures that may occur in each component of each unit. There may be multiple rows for the same root cause, uniquely qualified in name by appending a numeric suffix, for example compressorFailed0, compressorFailed1, and so forth.

To facilitate the definition of the RCT, FSD may allow the definition of a row template that allows parameterized definition of one or more RCT rows. FSD may use the '$' character as an example of an escape character followed by zero or more numeric digits to indicate a parameter in a row template.

In one embodiment, a '$' with no following digit is replaced by the name of the row instance. A '$' followed by some numeric value i is replaced by the i-th argument specified in this row instance. If a parameter specification should be followed with a digit, the parameter specification may be terminated by a "$-" before the digit. If a '$' should appear in the row template, it may be escaped as "$+".

Row Template Definition. A row template may be defined with a name followed by a list of "rows," each defined with a parameterized name, a parameterized list of symptoms, and optionally a parameterized list of non-symptoms, that is, symptoms that are known to be false for this row/root cause. The following is an example of a row template definition:

```
"rowTemplate" : {
    "compressor" : {
        "row" : {
            "$Fail" : {
                "symptom" : ["environ/ambientTemp/high"],
                "notSymptom" : ["main/current/low",
                    "$/current/low",
                    "$/current/constantReading"]
            },
            "$CoolantUndercharged" : {
                "symptom" : ["$/superheat/high",
                    "$/subcooling/low"],
                "notSymptom" : ["main/current/low",
                    "$/current/low",
                    "$/current/constantReading"]
            },
            "$CoolantOvercharged" : {
                "symptom" : ["$/superheat/low","$/subcooling/high"],
                "notSymptom" : ["main/current/low","$/current/low",
                    "$/current/constantReading"]
            },
            "$BlockageInCoilsOrficeLineSet" : {
                "symptom" : ["$/superheat/high","$/subcooling/high"],
                "notSymptom" : ["main/current/low","$/current/low",
                    "$/current/constantReading"]
            },
            "$StuckOrTooBigOrfice" : {
                "symptom" : ["$/superheat/low","$/subcooling/low"],
                "notSymptom" : ["main/current/low","$/current/low",
                "$/current/constantReading"]
            },
            "$ShortCyclingCompressor" : {
                "symptom" : ["$/runtime/StartToStartShort"],
                "notSymptom" : ["main/current/low","$/current/low",
                "$/current/constantReading"]
            }
        }
    },
    ...
```

The above example row template defines 6 rows, each parameterized by the '$', indicating the name of the row instantiation statement. Each row in the template specifies a parameterized name, plus a collection of the true symptoms in "symptom" and the symptoms that may be known to be false in "notSymptom."

When instantiated, each row name may be unique. Moreover, every symptom named in the symptom and notSymptom arrays may have been defined by the symptom definition facility described earlier. FSD may generate error messages if these requirements are not met.

RCT Row Template Instantiation. The RCT JSON file may contain a collection of row template instantiations, each specifying a name, the row template name, and a list of arguments for substituting into the parameterized entries in the row template.

For example, the above row template may be instantiated as:

```
"rowTemplateInstance" : {
    "compressor0" : {
        "rowTemplateName" : "Switch",
        "arg" : [ ]
    },
    ...
}
```

With this instantiation, there may be six rows defined in the RCT with each occurrence of '$' replaced by the name of this instantiation, namely "compressor0." The following is the first generated row, with the '$' replaced by the name of the rowTemplateInstance, "compressor0" in this case:

```
"compressor0Fail" : {
    "symptom" : ["environ/ambientTemp/high"],
    "notSymptom" : ["main/current/low",
    "compressor0/current/low",
    "compressor0/current/constantReading"]
},
```

If there was more than one power source, that may be parameterized in row template as:

"notSymptom":["$0/current/low", . . .

wherein the first argument in the instantiating row instance may specify the name of the power source.

The row template facility may significantly reduce the size of the JSON file required to define the RCT of a complex system, especially when there are many instances of the same units. In this case, a row template may define the common rows for each such unit, qualified by a parameter, so the row template may be instantiated for each such unit, generating multiple rows.

In the event an SUD includes only one instance of a given unit, a row template for that unit may be defined and instantiated once, namely for that unit. In this case, there is no need for parameterized row names and symptoms, but it may still be warranted to follow the pattern of parameterizing by name of row instantiate for uniformity.

The args list is primarily used when a root cause row has dependencies on a symptom in another unit. Automatically generating these arguments would require knowledge of the dependency topology of the units, so it is deferred to a separate domain-specific program.

RCT Development Strategy. One starting point to developing an RCT specification is to identify the different root causes of faults that an SUD in the target domain may have. For example, in a refrigeration system, the compressor may burn out and thus fail to run. Therefore, there may be a row in the RCT that is labeled compressor$Failure.

Then, with each such root cause, observable indications that this root cause has occurred may be identified. There are normally many root causes that are not observable. For example, a sensor may not report directly whether the compressor has failed or not. An observable indication from a compressor failure is typically that the temperature in the refrigeration unit is not decreasing. Each required symptom for indicating a root cause should be added to the symptom collection in the fault scenario corresponding to this row, that is, root cause.

In some cases, the indicator of a root cause points out the need for the definition of a new symptom. For example, it may not be originally thought of as having a symptom for insufficiently decreasing temperature. In this case, it may be possible to return to the symptom definition and add this symptom at this stage.

An indicator may not directly be provided by a sensor in the SUD, but needs to be computed indirectly from the reported values. In this case, an Indicator object may be introduced that provides the computed value and maps this onto the SUD scenario. In the above example, an indicator may be used corresponding to the first derivative of temperature, and a threshold mapping onto the SUD may be used that sets the associated symptom when the SUD is in cooling mode and this first derivative is higher than some threshold value, that is, not sufficiently negative. The configuration of indicators and indicator mapping is described in more detail below.

After identifying these observable indicators of faults that suggest a given root cause, the next step is to consider other root causes that may result in the same indicator. For example, if there is no power to the compressor, the compressor may not operate and thus the first derivative of the temperature may not be sufficiently negative.

To avoid false positives, any such symptom may be added to the notsymptom collection in the fault scenario corresponding to this row. Besides lack of power, it may be identified that the compressor is not going to run if it is not configured to run. Non-decreasing temperature may be seen if the reporting data path from the SUD refrigeration system is not working. Symptoms for these two cases may be defined as compressor$Misconfigured and compressor$NotReporting and the previous one as compressor$NoPower, thus the notSymptom would be specified as:

"notSymptom" : [compressor%NoPower","compressor$Misconfigured", "compressor$NotReporting"], The notSymptom symptoms effectively suppress false positives when another fault can cause similar symptoms. Logically, a row is matched when the SUD scenario has the symptoms true that are in the row's symptom collection and false for those in the row's notSymptom collection. Thus, in this example, FSD may not report a compressor failure when the compressor power has gone out, because the compressor$NoPower symptom is true in this case, causing the compressor failure row/fault scenario to not match.

If a root cause failure may be observable by different criteria, a row may be defined for each different set of criteria. It may be assumed that application mechanisms may map these row names to a common root cause.

FSD may be structured in terms of symptoms as opposed to indications of correct behavior. For instance, hypothetically inverting the logic so there is a condition compressor$HasPower may be used as an alternate technique. As opposed to this, the symptom approach is taken for several reasons.

First, there is often one state that is correct, but many states that are faulty, that is, symptoms. For example, the power may be low or spiking excessively as well as there being no power at all, whereas there is the single case of power being within specification. Consequently, simply taking the inverse of the good condition as a fault does not provide adequate identification of different types of faults. Thus, with symptoms, the number of symptoms may be expanded arbitrarily. The correct behavior is then just the absence of any of the associated symptoms.

Secondly, there are a lot of specific states in an SUD that may not be relevant to ARCA. Focusing on symptoms keeps the focus on the information that may actually be relevant to FSD.

It may be expected that an FSD configuration for a particular application domain and deployment evolves over time, extending the root causes and refining the symptoms associated with a root cause, both in the symptom and notSymptom. It is valuable to have regression tests that ensure that these changes do not introduce false positives or false negatives.

Returning to RCT strategy, the above development of root causes and the associated symptoms leads to the identification of new symptoms, new indicators, and mappings of these indicators onto symptoms in the SUD scenario. The next topic covers the configuration of these indicators.

Indicator JSON Configuration File. In one embodiment, the FSD internal representation of sensor values from the SUD is stored in objects referred to herein as "indicators." Each indicator provides a single value in the attribute Fsd::Indicator::estimatedVal that is a double precision floating point number in representation. It is referred to as an estimated value because it may not correspond to any value actually reported by a sensor on the SUD, but is estimated by various means, including interpolation of sensor values. It may also provide a mode attribute, indicating the current mode associated with this value.

An Indicator also may list one or more fault scenarios that are assumed by this indicator. For example, if it is assumed in the computation of the value of this indicator that the refrigerator temperature sensor has failed and this temperature has been computed from other factors, one of the fault scenarios listed with the indicator specifies refrigerator temperature sensor failure. This facility allows an indicator to reflect through the assumptions behind how it is computed. In a normal case, this list may be expected to be empty.

An Indicator instance may be defined as the output of its associated operation on its inputs. For example, an indicator may be defined to provide its estimated value as that of the maximum of the estimated values in its input indicators.

An Indicator also may indicate the confidence in its value, which is normally determined by the confidence in its inputs, depending on how it is computed from its inputs. For example, the confidence of the max operation is that of the input chosen as the maximum, assuming the other inputs are significantly less. The confidence of a sum operation may be computed as the weighted average of the confidence of the inputs, depending on the amount each input provides to the final sum. A simpler approach is to just have the confidence be the minimum of the inputs.

The current operators supported are:
    input—pseudo operator, meaning it is set from external input data, and takes no indicator inputs;
    summation—unary operator, summing over some specified interval;
    averaging—unary operator, averaging over some specified interval;

duration—unary operator, measuring the duration of the input indicator in a particular mode;
polynomial—polynomial output of its single input;
stepFunc—table-driven stepFunc output of its single input;
print—std error output of selected indicator, primarily for debugging;
stdDeviation—incremental standard deviation of its input;
max—n-ary operator;
min—n-ary operator;
difference—binary operator;
absDifference—absolute difference binary operator;
sum—sum of its K inputs; and/or
predictQualifier—output the first input if close enough to the second input (the predictor), else use the predictor.

New operators may be added relatively simply. The JSON Indicator configuration specifies a collection of indicators to be used by FSD to compute values of interest to symptoms from the supplied inputs. Each JSON specification of an indicator includes:

"name"—name of the indicator—this is optional and defaults to the name used for the entry;
"op"—the operator that computes the value of this indicator, e.g., difference;
"mode"—the initial operation mode; optional, defaults to "any" as specified by −1. Otherwise, the operation associated with the indicator only updates the indicator when the inputs are in the specified mode;
roundsPerUpdate—number of input rounds between updates to the indicator estimated value. Optional, defaulting to 1;
"input"—the input indicators to the above operator, as an array of their names; and/or
"args"—option arguments to the operator, if any.

The indicator file optionally specifies the outputClockName, specifying an indicator to be used as the output clock. If this name is not specified, it defaults to "outputClockIndicator." The output clock is used to trigger reevaluation of the mappings described below against the estimated value of the input indicator, then setting or clearing any symptoms in the SUD scenario. It may also be used to determine when a value has been too constant. That is, the maxConstantRounds may be measured by this clock.

The following illustrates without limitation the definition of a collection of indicators for computing superheat and subcooling in a refrigeration system, starting with the standard output clock and subscenario indicators.

```
{
  "indicator" : {
    "suctionPressureInKpa" : {
      "op" : "polynomial",
      "input" : ["suctionPressure"],
      "arg" : ["100.0","100.0"]
    },
    "suctionSaturationTemperature" : {
      "op" : "polynomial",
      "input" : ["suctionPressureKpa"],
      "arg" : ["3.67E-31","7.02E-27","-5.81E-23","2.73E-19",
"-7.99E-16",
        "1.52E-12","-1.90E-9","1.55E-6","-8.23E-4","3.17E-1",
"-70.575084"]
    },
    "suctionLineTemperature" : {
      "op" : "input"
    },
    "suctionSuperheat" : {
      "op" : "difference",
```

-continued

```
      "input" :
["suctionLineTemperature","suctionSaturationTemperature"]
    },
    ...
  }
  "outputClockName" : "outputClockIn"
}
```

Optionally, "roundsPerUpdate" may be specified, which defaults to 1. Also, "mode" may be specified per indicator, which defaults to "any," that is, −1. The number of indicators in the input collection is specific to the indicator operator. Some operators, such as "input" accept no inputs. Other operators are unary, such as summation, and only allow and/or require an input indicator. The arguments are also interpreted relative to the associated operator.

In response to reading the indicators file, FSD instantiates each of the specified indicators. Each input to an indicator must be an indicator defined in this file. The inputs to the indicator must also match in number the amount that is expected by the associated operator. A macro facility may be provided for the RCT, to allow uniform specification of indicators across units and components, especially for the network domain. The macro facility may include indicator mappings as well.

The next aspect of FSD configuration comprises specifying the mapping of the metrics provided by these indicators to the actual fault scenario, that is, the SUD scenario. This mapping is specified by the indicator mapping file, as discussed next.

Indicator Mapping JSON Configuration File. An indicator mapping maps an indicator into one or more symptoms, true or false, based on its estimated value and mode. An indicator mapping is only applied on update to the output clock. For example, if the input clock is updated every one second but the output clock is only updated every ten seconds, symptoms in the SUD scenario are updated every 10 seconds. Correspondingly, the RCT matching may also be performed every ten seconds.

By default, the clock used by a threshold is the output clock specified in the Indicator file. Optionally, a separate clockName of the output clock to use may be specified.

There are at least three types of mapping:
1. ConstantMap—detects if the indicator has been excessively constant, often an indication of a broken sensor;
2. Threshold Map—maps to symptoms based on the value of the specified indicator being out of range based on a threshold specification; and/or
3. EstimatedValMap—maps the indicator value of its indicator input to that of the SUD scenario.

As with indicator operators, FSD uses additional forms of indicator mapping, as needed.

ConstantMap
1. maxConstantRounds—maximum number of rounds (of the output clock) that the input value can be constant before it is considered a fault;
2. constantSymp—name of the RCT symptom to be set by this map; and/or
3. allowedDelta—the minimum change that is considered a change in the value.

ThresholdMap. A threshold map is specified by specifying:
1. minThreshold and maxThreshold values, defining the lower and upper bounds on thresholds; and 2. the names of the symptoms for being lower than the min, higher than the max, out of range in general, and being too constant.

The following is an example specification of a Threshold map, which maps the indicator named "leaf1::power" onto specific symptoms in the SUD scenario, based on the estimatedVal attribute of "leaf1::power."

```
{
    "thresholdMap" : {
        "leaf1:power/thresholdMap0" : {
            "allowedDelta" : 0.01,
            "maxConstantRounds" : 100000000,
            "constantSymp" : "leaf1/power/constantReading",
            "minThreshold" : [4.0],
            "minThresholdSymp" : [13.0],
            "maxThresholdSymp" : ["leaf1/power/high"],
        },
        ...
    }
    ...
}
```

Each symptom name may have been defined previously in the RCT file, as described earlier. A threshold mapping may be defined with an input indicator that is already an input to other indicators. Multiple threshold mappings may be defined for the same indicator. The behavior is not defined in the SUD scenario when multiple thresholds map to the same symptom except if each mapping has a separate mode and not "any," so only one mapping is active in setting a symptom on each output clock round.

A threshold mapping may also be defined to compute the threshold using an operator on its inputs. For example, adding:

```
"otherIndicatorName" : "expectedResult",
"op" : "difference",
``` to the above definition, the threshold is computed based on the difference between the "result" indicator and the "expectedResult" indicator.

Operators supported include min, max, sum, and difference. The difference operator may often avoid a separate difference indicator when the threshold is computed on the difference between two indicators, as may arise in tests, and in detecting failed sensors. Besides reducing the number of indicators, another advantage of using an operator in the threshold is that the operator is only evaluated on the output clock, not on every input change.

EstimatedValMap. This mapping may make the estimatedVal of the specified indicator be the estimated value available in the SUD scenario. In one embodiment, FSD uses additional types of mapping.

The next portion of FSD configuration is mapping input files to the FSD indicators, as described next.

FSD JSON Input Binding and Clocking. FSD may be configured to read sensor data on the SUD from input data files. The input data files can be in various different formats and may contain multiple sensor values.

Input Bindings. The JSON input binding configuration file specifies the collection of the input files, and for each input file:
1. the input adapter type for processing this data format;
2. the bindings of fields in the input records to FSD indicators; and/or
3. prediction delta—the difference between the input value and that predicted by the adapter before the input value is ignored as erroneous and the predicted value is used instead. A value of 0.0 indicates no prediction should be applied, i.e., it is not a continuous value.

CSV File Format. In one embodiment, a primary input supported is CSV, with the time in seconds as the first field, zero or more ignorable fields, and then the text name of the field followed by the value of that field/sensor at the specified time. For example, 23.0,JuiceBar4,rtu0-compressor0%temp,4.3

In the above example, the input record is at time 23.0 seconds from the start time of the input file. It is associated with site "JuiceBar4," which may not be relevant to the FSD processing, so is an example of an ignored field. The sensor is identified as "rtu0-compressor0%temp." The reading of this sensor at this time is 4.3 degrees Celsius.

Note: this adapter treats a line starting with "//" as a comment line.

The time on a line may be omitted such that the input line starts with a "," in which case the time is taken as the previous value of the time. The following is an example input binding.

```
"inputFile" : {
    "/data/juicebar4:oct2417:3to6pm.csv" : {
        "name" : "/data/juicebar4:oct2417:3to6pm.csv",
        "adapterTypeName" : "csv",
        "ignoredInputFields" : 1,
        "binding" : {
            "rtu0:compressor0:temperature": {
                "indName" : "rtu0:compressor0:temperature",
                "fieldName" : "rtu0-compressor0%temp",
                "adaptationQualifier" : "",
                "predictionDelta" : 1.5
            },
            ...
        }
    }
    ...
}
```

This configuration indicates that FSD should read from the input data file with pathname "/data/juicebar4:oct2417:3to6pm.csv" using the generic CSV adapter. Also, a value with a field name "rtu0-compressor0%temp" may be mapped to the indicator named "rtu0:compressor0:temperature." An adaptationQualifier of null string indicates the system should use the default specified input adapter processing. This attribute is intended to modify the processing for the associated field when specified. As well, the predictionDelta specifies that the input value needs to be within 1.5 degrees of the predicted value or else it is ignored in favor of the predicted value. This allows FSD to process raw sensor input without being compromised with incorrect sensor readings.

The first " . . . " indicates that additional field bindings may be specified for this file. If the option "allowsDefaultInputToIndicatorBinding" is true for this input file, which is true by default, FSD may automatically attempt to map an input field name to the indicator of the same name, if it is not otherwise specified. In this case, the defaultPredictionDelta may be used for the prediction delta and the adaptationQualifier may be null. This default reduces the number of bindings required in the common case if it is feasible to name the input indicators by the same name as that used for the corresponding input field.

FSD may generate an error if it encounters an input field for which there is no corresponding indicator. In one embodiment, a best practice is to map any input field that is not of interest to an indicator that is not otherwise used. The alternative of having FSD ignore input fields that it does not recognize may unfortunately lead to input data being silently ignored, making it harder to debug the resulting problems.

With this format, a common case is that a file contains inputs from a variety of sources or sensors. Otherwise, it may be more efficient to not specify the field name. For example, an HVAC input file could contain the readings from pressure, current, and temperature sensors associated with a given RTU.

An alternative CSV format is one in which each record contains a fixed sequence of input values, one per sensor. Then, the cost of specifying the time is amortized over multiple readings and there is no need to specify the field-name repeatedly. However, it is common that not all sensors may be read at the same time, so it may not be possible and/or superior for some systems. FSD allows additional input adapters to be added relatively easily.

Clocking. FSD operates in what is referred to herein as "rounds," which are fixed clock periods, to enable proper time calculation. There is an output clock and an input clock. The input clock determines the rate at which the indicators are updated from the input data. It is not governed by the times associated with the input data. Instead, if the predict-Delta attribute associated with the input field is non-zero, FSD interpolates each input value to estimate the value at the input clock time, determined from the actual input data it has read.

For example, if the input clock round occurs at 3 pm, yet there are only input readings of a sensor at 2:59 pm and 3:01 pm, it may use linear or other interpolation between these two values to estimate the value to write to the associated indicator at input time 3 pm. This interpolation is important to deal with sensor readings from different sensors that are read at different times, while at the same time providing a sound diagnosis of the state of the SUD. For instance, the power sensor may be sampling every second because the current may change quickly while, on the other hand, the temperature may be sampled once per minute because it changes slowly and linearly.

The FSD is also configured with an output clock. This clock dictates how often it performs mapping to indicators to the SUD scenario and root cause analysis. This is important because root cause analysis may entail matching the SUD scenario against thousands of RCT rows, and as such cost should be qualified to maintain expected processing time within seconds rather than hours.

In one embodiment, FSD allows root cause analysis to be partitioned and run in parallel, across multiple processes. It is naturally a data parallel computation, given there are no dependencies between row matchings.

The FSD output clock may be an integral factor of the input clock. For example, the input clock may update every five seconds to perform accurate computations such as that of standard deviation. By contrast, the output clock may update every 60 seconds to minimize overhead, further recognizing that in many applications, root cause analysis of a problem in less than one minute has little or no benefit.

FSD JSON input binding file may include a second section after the input file bindings that specifies the timing parameters:

1. secondsPerOutput round, where the seconds refer to time in the SUD using the time reported in the input data;
2. inputRoundsPerOutputRound—this allows the input clock period to be computed from the output clock;
3. startTime;
4. endTime—to stop the processing of input. If the end time extends beyond that of an input file, FSD extrapolates the metrics forward in time using the same linear prediction logic used by interpolation; and/or
5. warmupTime—time to start reading input data before any root cause analysis takes place. This allows the various indicator computations to be initialized properly, to avoid false positives that might otherwise arise.

An example timing section from an FSD JSON input binding file is:

```
"secondsPerOutputRound" : 30.0,
"inputRoundsPerOutputRound" : 6,
"startTime" : { "secs" : 0, "usecs" : 0 },
"endTime" : { "secs" : 1234, "usecs" :0 },
"warmupTime" : 0.0,
```

The output clock is specified as having a round every 30.0 seconds in SUD time. Note that the output clock typically executes far faster in real time when FSD is executing. For example, FSD may process five minutes of input data in less than five seconds, assuming it is run every five minutes on the newly received sensor data.

There are six input rounds per output round, so there may be an input clock round every five seconds of SUD time. The startTime, endTime, and warmup time are self-descriptive. In an expected use case, the input data file covers a known time period in the past, so FSD may be invoked with the end time corresponding to the end of the time covered by the input data file. However, because the input data file may contain data from different sensors that are read at different rates, FSD may reach the end of the input data file before the end time, causing extrapolation to be used, as described earlier.

Traps. FSD provides a what is referred to herein as a "trap" facility for taking action when a particular RCT entry is matched to or unmatched from. A trap on the root cause table itself may be defined, which causes this trap to be used on a row when there is not a specific trap defined on this row.

A trap may also be placed on an indicator map to detect when this map causes a symptom to be set or unset. The input binding file optionally contains a trapDesc collection describing the traps to set on configuration. A trap description consists of:
  name of the trap
  category—currently either RCT or map
  condition to trigger that trap, which may be one or more of:
    isSetFault—setting a symptom,
    isUnsetFault—unsetting a symptom
    isMatch—matching the associated map or RCT entry
    IsNonMatch—non-matching the associated map or RCT entry
  action—the action to perform on trap, which may be one or more of:
    isSuspendingOnTrap—suspend the FSD processing. This is primarily intended for an interactive debugging mode, not yet fully supported.
    isIncrementingExpectedMatchCount—increment an expected match count—used by test programs
    isIncrementingUnexpectedMatchCount—increment an unexpected match count
  used by test programs
    isLoggingOnTrap—log the trap to a file.

Setting a trap on the RCT itself may have special aspects. First, if the "row" is specified as the null string, FSD may map that trap to the entire RCT. Second, specifying the condition as "isNonmatch" means that it determines the symptoms that are not mapped in matching the SUD scenario against the RCT. This allows one to determine what symptoms are not being matched at all. The "normal" semantics of having it trap on every row of the RCT that it is does not match on may not seem useful.

Here is an example trapDesc that defines this RCT trap:

```
"trapDesc" : {
    "" : {
        "category" : "rct",
        "condition" : ["isSetFault","isUnsetFault"],
        "action" :
    ["isLoggingOnTrap","isIncrementingExpectedMatchCount"]
    }
},
```

This trap logs each setting and unsetting of a symptom in the SUD scenario as well as incrementing the expectedMatchCount on each such setting and clearing.

A common approach is to define this RCT trap, and then override with ones on specific rows, when specific rows require different conditions and/or actions.

This trap mechanism may be used for debugging FSD processing parameters and indicator configurations in application data sets. For instance, if a given row of the RCT is ever matched, a trap on that row may indicate that. The trap mechanism is also used for FSD test programs. For instance, FSD may be configured to process a specific test input file with known fault behavior. Traps may be used to determine that these faults are being detected and that no others are.

Input Processing and Timing. In one embodiment, FSD performs the processing in terms of rounds, that is, fixed repeated increments of time. It operates effectively with two clocks: the output clock and the input clock.

Rounds relate to the SUD time, that is, the time as indicated in the input data, by computing this time as the start of epoch time specified in SUD time plus the product of the number of rounds times the seconds per output round.

On each round of the output clock, FSD may re-evaluate the root causes being indicated, by matching the SUD scenario against the root cause table. For example, if Fsd::Config::secondsPerOutputRound attribute is specified as 30, FSD may perform this root cause matching every 30 seconds in SUD time when it is executing.

Note: the FSD processing is expected to execute substantially faster than real-time. For example, the FSD agent is designed to be invoked periodically, restart with its state as of the end of its last invocation, and process all the input data since the last it was invoked. For example, it may be configured to run every 30 minutes, processing the last 30 minutes of SUD input data, but only taking two seconds to do so.

The input clock may determine the rate at which the FSD indicators are updated from the data input. It may be specified in terms of the number of input rounds per output round. For example, if Fsd::config::inputRoundsPerOutputRound is specified as six (with the 30-second rounds for the output clock, as above), FSD may execute an input round every five seconds.

When the input clock is advanced to the next round, each input adapter may be expected to read its inputs until it has read an input that is later than the time for this input round, then compute by linear or other interpolation an estimate of this input value for the round time, and then update its associated input indicator. It then may indicate it has completed this input round. For example, if an input dataset provides samples every second, the input adapter may interpolate these samples to provide a best estimate of the value as of the input clock time. Note that in some instances it may not be appropriate to compute the value as an average over the samples because with a rapidly rising or falling input source, the average may be inaccurate.

In one embodiment, FSD executes behind real-time sufficiently that the data is available in time for each input time step. A real-time input adapter may fill in missing values as needed using extrapolation.

The same interpolation approach as above works if, for example, the input data provides samples every ten seconds. In particular, the input adapter may provide an interpolation of the input data to provide a best estimate of the value as of the current input clock time. The input data may also provide values that are read at irregularly spaced intervals, that is, jitter. For example, the times between readings from a temperature sensor may vary between ten seconds and 30 seconds. The input adapter may use linear or other interpolation, allowing for the difference between the times for the readings. This interpolation may also handle the situation in which the input data times do not match with the input clock. For example, the input clock could specify 3:01:05 pm but the input data was read at 3:01:03 pm and 3:01:08 pm. That is, input data may have the same period as the input clock but not synchronized with it. The input adapter would estimate the time of its data at 3:01:05 pm. In one embodiment, different input sources provide data at different time steps. These are all effectively "synchronized" to the input clock by interpolation as above.

The output clock may be configured with a round that is substantially longer than the input clock to reduce the overhead of running the root cause analysis processing. For instance, having an output round of 30 seconds means a fault may be discovered within 30 seconds of it being indicated, which is normally sufficient, but incurs ⅙th the overhead of root cause analysis processing compared to running it every five seconds, the input round time. Conversely, the input clock may be configured with a shorter round than the output clock so that finer-grain processing may take place if the input data has more frequent updates than the rate at which root cause analysis is performed. For example, if the standard deviation of some potentially rapid changing input over the 30-second period is needed, the standard deviation may be updated every five seconds, based on a 5-second input clock.

In one embodiment, there may be limited benefit to configuring the input clock with rounds shorter than any of the input data because the input adapters typically have no additional input data for many of the rounds. In some cases, it may have some benefit if the timing of the readings is out of phase with the input clock.

FSD Configuration Development and Debugging. In developing a diagnosis system using FSD for a particular application, the following stages are helpful:
1. specify the symptoms and RCT as above;
2. define the computation network of indicators;
3. map one or more of these indicators onto the SUD scenario;
4. define the mapping of input data files to indicators and the clock/timing configuration; and/or
5. debug this system against various input data files, verifying that it is providing accurate analysis, i.e., no false positives or false negatives.

On the latter stage, every step of FSD configuration has the potential for error. Some key debugging scenarios include:

1. figuring out what caused a false positive; and/or
2. figuring out what caused a false negative, i.e., non-detection of a symptom.

Considering the end-to-end behavior of FSD, a given version may fail to output the correct root cause because of any of the following:

1. wrong symptoms specified for the root cause in an RCT row;
2. an incorrect parameter is specified to a threshold mapping of an indicator to the RCT;
3. an incorrect computation is specified for the output of an indicator; and/or
4. an incorrect input binding or clock configuration is specified.

For the first case of a bad RCT, a trap may be set on the associated row with the desired actions to catch this occurring and then inspect the state. In one embodiment, interactive running of FSD is supported, using the trap mechanism for interactive debugging. For example, if FSD is not matching a scenario to a probable root cause that it should be, a trap may be set on the rows corresponding to that probable root cause with the condition being non-match. Then, one can inspect why it is not matching.

For the second case of threshold mapping issues, a trap may be set on a threshold to check why a symptom is being set or not being set, and adjust the parameters accordingly. Trying to set a trap on a missing threshold may cause an error indication providing a signal that this threshold definition is missing, if that is the problem.

For the third case of an incorrect indicator computation, FSD may be run with a test input data file that provides the expected value for a given indicator in addition to the normal input data files. A difference indicator may be configured between this "gold file" input and the indicator that is supposed to be computing this value, and have a threshold mapping that sets a symptom if the difference is larger than acceptable. With this approach, traps may be set on the threshold mapping or on the associated RCT row as above to trap when the discrepancy arises. FSD also may provide a print indicator that may be used to output the computed value for visual inspection or for separate comparison to known values. For example, every change to the output clock may be output using:

```
"outputClockInPrint" : {
  "op" : "print",
  "input" : ["outputClockIn"],
  "arg" :
["hasValue","hasMode","hasConfidence","hasFaultScenarios"]
},
``` in the JSON indicator configuration, assuming the output clock indicator interface is named "outputClockIn." The print operator only outputs if verboseMode is set, as described later.

For the fourth case with incorrect input bindings, FSD may be configured to generate an error by default if an input field is read that is not mapped to an indicator, or when the value for that field is bad.

Verbose Mode. A verbose mode may be activated by an FSD command line parameter "-isVerbose." FSD may then output various messages to standard error, including a message per map and RCT trap that is hit. In one embodiment, the time indicated is actually the next round, not the current round.

Production Execution of FSD. One mode of operation of FSD is for it to be invoked periodically to process a last window of SUD input data, with this period dependent on the application domain and user requirements. For example, with HVAC monitoring, it may be sufficient to run FSD every 30 minutes, because the response time to a root caused failure within that period is sufficient. In a network context, running it every ten seconds may be more appropriate.

It may be assumed that a telemetry collection system is depositing sensor/probe data from the SUD into files continuously in a format for which FSD has an input adapter, and in monotonically increasing temporal ordering.

FSD may restart on each re-execution, continuing from the previous SUD time, with the state of internal objects such as accumulators recovered from the previous execution. For example, if FSD is generating some indicator as a weighted moving average, the indicator may continue with the next input on its re-execution the same as if it had been executing continuously.

FSD may process the input data much faster than SUD real-time. Therefore, in the network example, FSD might execute for one second to process the past ten seconds of data. This periodic execution is effectively batching the processing rather than reacting continuously to real-time input. This may be more efficient than having FSD run continuously, waiting for additional input. It also means that the restart mechanism may be continuously exercised, ensuring fault tolerance.

In one embodiment, to allow fast stateful restart, FSD is designed to recover its critical internal state from a binary representation of its state stored in sysdb. On restart, FSD mounts state from sysdb and unless it is specified otherwise by command line parameters, uses this state if it is initialized, rather than reading the JSON configuration files. In one embodiment, it is assumed it is continuing on from the last point in time that it processed to. For example, the RCT is stored in sysdb as a collection of Tac::Entity's, each with a row collection, so recovers much faster than initializing from the JSON specification. The indicator, indicator mapping, and input binding configurations are recreated similarly from sysdb, rather than re-reading the JSON files. This sysdb recovery of state may also be used if FSD fails and is restarted immediately to recover from the failure.

Summary In one embodiment, FSD is highly configurable to handle different diagnostic requirements and application semantics. It inputs temporally-tagged data from an SUD and produces event logs indicating root causes to failures, if any. It also may include trap support for debugging its configuration for a particular application domain and deployment.

FSD enables the design of telemetry and root cause analysis of a distributed application as part of designing an application. FSD allows one to leverage how things may go wrong in production; planning for that and supporting fast remedial action enables supporting high availability.

Appendix: Operators

StepFunc. StepFunc supports a "modal" indicator that may define a separate step function for each input mode of the same input indicator. For example, the stepFunc operator may be defined to provide a predictive result for a refrigeration temperature when the compressor is running as one mode, and a separate computation for when the compressor is not running by having a separate mode associated with it not running. A qualifier suffix may be provided to the output indicator name that is unique for each such stepFunc to avoid name collisions. For example, the stepFunc indicator for off mode may be defined as predictedTemp/off with the mode specified as 0 while the stepFunc indicator for on mode may be defined as predictedTemp/on with the mode specified as 1.

It may be an error to specify the two different stepFunc operators with the same output interface and conflicting modes, that is, the same mode or one specified with "any" mode.

Print. The Print operator is for debugging FSD applications. It takes a single input and outputs the values of the fields of the indicator indicated by the args, defaulting to just the value, if no arguments are specified.

The supported arguments comprise:
hasValue
hasMode
hasConfidence
hasFaultScenarios
The output format is:
indicatorName<mode>time=val <confidence>{list of fault scenario names}
with the enclosing delimiters omitted if the field is not output.

Appendix 2: Advanced Topics

Auto-tuning Prediction-based Indicator. The computation of an indicator may be automatically tuned by providing feedback to the parameters of an indicator based on other indicator states. For example, the values used by a stepFunc indicator node may be adjusted by another node, such as another stepFunc node that has its output, the stepFunc parameters of this first indicator.

One example of this case is using prediction to guard against sensor failure, which may otherwise compromise the computations with incorrect values. One technique is to "predict" the value of the input sensor of concern at the next time interval, and then compare the actual reading against the predicted reading. If the actual reading is too far from the predicted reading, it is assumed that the sensor reading is bad. However, this requires that the prediction be reasonably accurate, which means tuning the parameters of the prediction to the system.

Prediction may therefore be generated in a variety of ways. One example is a stepFunc node, which may extrapolate from the current estimated value and step function defined by the indicator to compute the next value, either as the actual value or as a first derivative of the actual value. For example, in a refrigeration system, the cooling rate computed from the change in cooling temperature is provided to a stepFunc node to estimate the cooling rate. From the cooling rate, a prediction node may predict the temperature at the next round time.

The actual choice between the predicted value and the actual value is done by using a PredictQualifier indicator node that takes both the prediction and actual as input and outputs either the predicted or actual, depending on the allowed delta and the confidence in each of these inputs. It may also output an average between the two. There is also a difference node that computes the delta between actual and predicted as input to a parameter correction, the prediction difference. The prediction difference may be used to do some nominal correction of the prediction parameters in the stepFunc node, that is, if the prediction is slightly high, the associated parameter can be adjusted down, and vice versa.

This capability is a form of "back propagation" in the sense that some relatively high-level indicators may be used to refine the confidence in some lower-level indicator. For example, in a refrigeration system, the behavior of the cooling may be used to estimate the current consumption by the compressor and fan. This estimate may be fed back to be combined with the input from a current sensor on the compressor and fan circuits. Viewing this estimate as a predictor in some sense of current consumption, it may be used to detect when the current sensor has failed or performing unreliably.

Output as Input. In one embodiment, FSD allows outputting a root cause in a format suitable to be read by one of the FSD input adapters. For instance, a root cause may be output in CSV format, with the SUD time that this root cause was detected, followed by the one or more ignorable field names, and then the name of the root cause as the input field name, followed by the value of 1, indicating that it is true, or else 0 if false, when it is no longer true. Then, the CSV input adapter may read a file containing these values the same as an input data file.

This capability allows one instance of FSD to determine a value that may not be directly observable, namely the root cause of one SUD, and then provide this value as input to another instance of FSD. For instance, if the power being delivered to an SUD is not directly observable, an FSD instance may determine the root cause of its behavior is loss of power. If another SUD is on the same power source, this root cause may be provided to an FSD instance dealing with this second SUD as an input.

Parallel Root Cause Analysis. In one embodiment, FSD is configured such that the RCT matching is performed in parallel by separate agents executing in parallel. Each agent simply mounts the SUD scenario and the RCT and is assigned some subset of the rows of the RCT to match against. In one embodiment, the RCT is partitioned among these agents. Note that typically there is no order-dependence in matching against the RCT. In one embodiment, the RCT is structured at scale as multiple explicit partitions, so each agent only has to mount the partition it is processing. This partitioned parallel execution means this aspect of FSD, which may be expensive, may scale to very large systems.

Dynamic FSD Configuration. It may be expensive to run the diagnosis all the time. For instance, if a refrigeration system is cooling properly and not using excessive power, there may be no need to monitor every component of the system. In this example, there may be thresholds associated with these key "end-to-end" measures and symptoms that are set as the root cause of the system not performing adequately. For instance, there may be a root cause "excessive energy consumption" that is triggered by the system going over threshold in power consumption.

In response to this top-level root cause, a new FSD process instance may be launched that is configured to root cause this excessive energy consumption. It may then process the sensors of various components to root cause analyze this problem, which may include coolant leakage, compressor supercylcing, dirty coils, and so forth.

An FSD processing instance may be configured to exit after some period of time when there are no root causes, returning the system to the state of only root causing the top-level end-to-end root causes.

Example Use Case: Network Diagnosis. Using the above embodiment, FSD, for network diagnosis of a given network, requires following the steps described in the above general tutorial for each such network. There are also parameters particular to network diagnosis as will be described below. Without limitation, this use case shows how a specific use case may be addressed by the disclosed techniques. In particular, symptoms should be defined for each interface on each switch or other device in the network. An RCT may then be defined for that network with a row for each possible root cause fault in this network.

This is specific to a particular deployment of a network because the symptoms and RCT should cover every device in the network, which varies between networks. The RCT should capture the dependencies in some cases that arise from a specific network topology. For example, the diagnosis may be different if one end of a link detects a fault but the other end does not, versus when both ends detect a given fault.

In one embodiment, a separate program generates the FSD JSON configuration files from a network topology description. As described in the general tutorial above, FSD may provide some support for this task by allowing you to define types that may be instantiated with specific arguments. Various "unit" types such as LeafSwitch may be defined in terms of components such as interfaces, border gateway protocol (BGP) connections, and so forth, which are defined in terms of component types, which are in turn defined in terms of metrics that each have their own associated set of generic symptoms. Similarly, FSD supports the definition of one or more "row templates," defined herein as a template to aid in reducing the redundancy in defining rows of the RCT. For example, a RowTemplate may be defined for a LeafSwitch, and then instantiate it for each leaf switch in the network.

This support reduces the size of the JSON configuration files, which is beneficial to FSD startup time. Given that configuration files are automatically generated from a network topology description by some separate program, this capability does not necessarily reduce the time to write these configuration files. This tutorial describes the general approach to defining an FSD configuration for diagnosis of a computer network, starting with network-specific fault conditions/symptoms.

Configuration Development Strategy. Building on the development strategy described in the above general tutorial strategy section, the starting point for a network is to identify and list the root cause failures that may occur.

In a computer network, there are multiple layers to the functionality and mechanisms, for example, a physical interface layer, link layer, transport, routing, overlay, and so forth. For example, a physical interface layer symptom may be downWhenConfiguredUp. Note that "link down" is not a fault condition/symptom unless it is supposed to be up. At a higher layer such as BGP, there may be a symptom holdTimerExpired. It is valuable to structure the symptoms into the conventional network layers because higher layers are generally dependent on the lower layers.

A start is to define symptoms at the lowest layers first and work up to the higher layers. This is because a lower layer fault often generates higher-level symptoms. To suppress these higher level symptoms triggering false root causes, the lower layer symptoms should be defined so they can be specified in the notSymptom collection associated with higher-level root cause fault scenarios. In some cases, these lower-level symptoms should be specified for the neighbor switch interface to suppress false positives. For example, it is not a BGP root cause if the neighbor has its interface configured to be down when it should be up.

Symptoms. A next step is defining network metric types to provide network-required symptoms. This allows the definition of metrics in components such as interfaces and units such as switches that contain a collection of interfaces, to then instantiate these switches in FSD, so there is a symptom defined for each possible symptom in each interface in each device in the network. For example, if there is a switch switch004 and interface eth4, there is a switch004/eth4/link/downWhenConfiguredUp symptom.

One suggested approach is to define symptoms that correspond to observable conditions, whether directly by a sensor input or independently by computing from direct inputs. This observability excludes faults such as a broken cable, assuming there is no sensor on the cable. However, non-observable faults may be identified by the root cause analysis, as described later.

The following outlines some metric types that may be used as a starting point. Network Symptom Metric Types:
   Misconfiguration Metrics
      Misconfig:
         configureMismatch
      UpDownConfig:
         downWhenConfiguredUp
         upWhenConfiguredDown
      OnOffConfig:
         offWhenConfiguredOn
         onWhenConfiguredOff
      CounterMetric
         constant
         zero
         low
         excessiveVariance
         peakingHigh
         high
   Physical Layer
      failedToSync
      periodicLossOfSync
      persistentLossOfSync
   Link Layer
      fewRcvErrors
      someRcvErrors
      manyRcvErrors
      totalRcvErrors
      transientTxTimeout
      frequentTxTimeout
   LLDP
   BGP—various BGP error codes may be a starting point, such as
      holdTimerExpired
      peerDeconfigured
   MLAG Network Component and Units Types. The RCT config file for a network may define one or more interfaces as component types. Most symptoms are associated with an interface, because an interface with associated software is the point of observation of faults. There is not typically a component type corresponding to the cable or wire between switches because no faults may be observed on a cable, only through root cause analysis.

Each interface type may define several different metrics corresponding to the different network layers, as developed above. The RCT config file for a network normally defines one or more switches as unit types. Each switch type needs to explicitly designate each interface instance of the switch. For example, for a 32-port leaf switch, the interface type is instantiated 32 times in the unit type definition of Leaf Switch. It is difficult to provide an iteration construct for this case because each interface has a different neighbor, so each instantiation is slightly different.

In a leaf-spine network, there may be at least two switch types, one corresponding to the leaf switch or TOR, and the other corresponding to the spine switch. Each of the switch types is instantiated the number of times that may occur in the actual network. Consequentially, as described in the general tutorial above, FSD generates specific symptoms per switch interface, layer and fault.

Network RCT Definition. The RCT may be generally defined as described in the general FSD tutorial above. Regarding network-specific aspects, there is typically a row template for each type of switch. The number of rows may equal the number of interfaces multiplied by the number of root causes associated with each interface. For example, if the switch model in question has 32 interfaces and seven root cause failures are associated with an interface, there are 224 rows defined in the row template for this switch. If there are 16 such switches in the network, this row template is explicitly instantiated 16 times.

The explicit instantiation of a row template for each switch is required, rather than providing an iteration construct, because the connectivity of each switch is different. For example, each leaf switch is connected to a different interface on the spine switch.

One convention with network row templates is to specify the parameters such that each even-numbered argument is the name of an interface and the next odd-numbered argument be the name of device and interface to which it is connected. For example, if spline0 is not connected on eth0, but is connected on eth1 to leaf0::eth0, and to leaf1::eth0 on eth2, the arguments in the instantiation of spline0 are:

"arg":["eth0"," ","eth1","leaf0/eth0","eth2","leaf1/eth0"]

The null argument string after eth0 indicates that it is not connected.

In a row template, there may be rows that are only meaningful if the interface is connected. In this case, the name of the other end may be included in the row template. Then, if this argument corresponding to the name is null in the argument list, indicating it is not connected, this row may not be generated internal to FSD. For example, if the link-level loss of sync on the first interface is specified in the row template for a switch as:

```
"$/$0-$1/linkSync/uniLossOfSync" : {
    "symptom" : ["$/$0/linkSync/persistentLossOfSync"],
    "notSymptom" :
["$/power/Low","$/$0/intfConfig/ConfigMismatch",
                    "$/$0/linkConfig/ConfigMismatch",
                    "$1/linkSync/persistentLossOfSync"]
},
``` and then this row is not generated when $1, the argument specifying the other end is null. It may be flagged as an error in FSD to have a row in a row template that uses an argument that is null, except in the name of the row. That is, inserting this argument into the name of the row effectively acts as a guard condition on generating the row.

Network Indicators. Some network indicators are numeric measures where the symptoms are defined in terms of being outside of some threshold range. For example, a switch interface may report the rate of transmit packet drops. A symptom is set when the packet drop rate exceeds some configured threshold value.

In the case of such a measure, an indicator may be defined for each interface that includes this value and a threshold mapping to the SUD scenario that sets the associated fault conditions/symptoms when the value moves outside of this range. This approach is applicable to many measures, such as switch CPU utilization, received errors, and so forth. The indicator value may be reported directly from a device or can be computed from some aggregation, such as a moving average.

In some cases, it may be desirable to provide multiple threshold levels, with different symptoms associated with each. In one embodiment, FSD supports a multi-level threshold mapping. In other cases, the reported observation is binary, such as an interface being configured to be up or down. In this case, the down/up binary indication may be mapped onto the Indicator estimated value of 0 and 1.0 respectively, and a simple threshold map can map the value onto a symptom when the indicator is 0 and the interface is supposed to be up.

Alternatively, each Indicator may provide a mode which may indicate whether the indicator is relevant or not. For example, if an interface is not enabled, the mode may be 0, indicating that normal thresholds do not apply. In one embodiment, FSD supports a bitset indicator that represents multiple binary values, and a bitset mapping that maps each bit that is not set as expected to a specified fault condition/symptom in the SUD scenario. This reduces the space overhead of having the large number of indicators required in a network.

Partitioning. The total number of symptoms and specific root causes for a network may be huge, in the many thousands. Therefore, there is some attraction to partition the state and the processing. One problem is the connectivity of a network does not allow clean partitioning by different switches. For instance, the diagnosis between leaf switches and spine switches may not be easily partitioned because they are connected and accurate diagnosis requires considering both ends of a cable.

An alternate approach is to partition the network diagnosis by layers. A physical network and virtual network layers may require this because these two may have different topologies. In this case, the physical network diagnosis may indicate faults or absence of faults to each virtual network diagnosis. Then, if the virtual network diagnosis may map the physical layer faults, if any, onto the virtual nodes, the virtual network diagnosis treats these physical layer faults as input data.

For instance, if there is congestion between switch S1 and S2 in the physical layer and these correspond to part of or the whole of the link between virtual switches VSi and VSj, this situation may be reflected into the virtual network diagnosis as an indicator on the VSi to VSj connectivity. Conversely, the absence of a symptom, that is the symptom value being false, from the physical network may be indicative that the virtual network issues are not attributable to the underlying physical network with a specified degree of confidence.

It may be feasible to also partition the physical network diagnosis between the link layer and higher layers. The link layer diagnosis may detect faults in the connectivity between directly connected neighbors in the network topology, and in the absence of such faults, indicate that network connectivity problems are, with high probability, due to faults at the higher layer.

This partitioning effectively uses multi-layer root cause analysis in which the layers are the network protocol layers rather than layers of detail. It may be feasible to use a combination of these two aspects to layering. That is, RCTs may be established for different layers, and then within each layer, separate RCTs may be established for different levels of detail. In one embodiment, there are two levels of details: one for whether it is basically working correctly, and another for detailed root cause when the first level detects that this level is not working correctly.

This partitioning topic is of interest because scaling diagnosis to large-scale networks is of critical importance. Some scaling analysis is considered next.

Scaling. Considering a network of 100,000 endpoints, there are then approximately 250,000 link endpoints. Each link endpoint may have 8 different blocks of fault conditions/symptoms, each costing 32-bits each, assuming not more than 32 fault conditions/symptoms per block. Each non-default entry in the fault scenario representation may have additional overhead so the space per non-default entry is 20 bytes. Thus, a fault scenario could in a worst-case be 40 megabytes. Note that it is likely that many conditions are known to be false in normal operations, which is important to suppress extraneous causes, so the SUD fault scenario is expected to be roughly this size.

Considering the RCT, the size of each row would depend on the number of devices involved in a potential fault. For most network fault conditions/symptoms, the "cared about" conditions are largely pair-wise with a point-to-point network, that is, what conditions are true at one end of a link versus at the other end. Each such row may require roughly two entries per layer in the upper layer case, where an upper layer fault may be diagnosed when the lower layers are fault-free. Thus, assuming eight layers, each row may be on the order of 8×2×20 bytes or less than one kilobyte.

Thus, there may be roughly 100,000 links and eight layers so 800 megabytes of RCT for this topology-related fault analysis. This estimate is refined lower, as some of the rows are for lower-layer root causes, in which case there are don't care values for the higher layers, so those entries are not present. Consequently, a normal commodity server is able to store the SUB fault scenario and the RCT even for a very large network.

Regarding processing overhead, most of the rows may not match quickly because few should actually have matching symptoms. In one embodiment, FSD performs the root cause table matching in parallel, as mentioned in the general tutorial above. Note that FSD does not re-run root cause table matching unless the SUD scenario has actually changed since the last time the matching was performed. Thus, in the absence of symptoms or if the symptoms are not changing, there is little overhead for running FSD.

Summary In this example, FSD provides the basis for efficient diagnosis of problems in networks of significant size, providing root cause analysis while avoiding extraneous false positives from cascading faults. This diagnosis depends on a careful definition of the FSD configuration in terms of symptoms, RCT, indicators, and input mappings. Part of this care means careful selection of symptoms and specification of root causes in terms of fault scenarios, considering partitioning of the diagnosis in layers, and frequency of execution of FSD to provide responsible response times.

Example Use Case: General Implementation. Consider the basic processing flow through an FSD agent (504).

Processing Flow in Time and Clocking. The processing flow and clocking of FSD may be handled as follows.

Input Module. The Input module in the Input::main:: process co-routine may cycle every input clock round, iterating over each input adapter. Every inputRoundsPer-OutputRound, it updates the outputClock Indicator::estimatedVal to trigger the ScenarioGen processing. Note that an indicator is used for the output clock because it is an interface that is available to both the Input and Scenario modules.

The Input module in the Input::main::process co-routine has an input adapter instance per input source, and waits until each adapter has progressed past the current input round, as indicated by the advancingInputs attribute going to zero. Each input adapter reads from a timed data source, mapping each metric of interest in the input source to an indicator, adjusting the value to the input clock round time for each input round. For input metrics that have a non-zero prediction delta, the input module uses linear interpolation between the input value just prior to the current input clock round time and the next input value after the current input clock round time for the metric, if it is available, and otherwise uses extrapolation. In particular, each input adapter may already read ahead of the current input clock round time when it indicates that it has completed this input round.

If the predictionDelta is 0, the metric may be assumed to be discrete and the value used is the last one prior to or at the same time as the current input round time. After indicating a new output clock round by using the outputClock, the co-routine waits until the ScenarioGen::lastOutputRound is incremented, indicating the ScenarioGen and Match have completed the output round.

ScenarioGen Module. ScenarioGen may be triggered to perform the mapping of indicator values onto the actual fault scenario by the input module updating the outputClock's Indicator::estimatedVal, as described above. This attribute is written on every output clock round by the Input module with the value in Tac::Seconds of the current SUD time of the input processing.

The ScenarioGen module iterates over the maps, mapping each mapped indicator into the actual fault scenario, and then, if the SUD fault scenario has changed and is past the warmup period, as indicated by the lastWarmupRound, updates the updateTime in the Match::Config interface, causing the matching module to perform the matching.

It then may wait until the Match module changes, indicating that it has completed the RCT matching, at which point it increments the ScenarioGen:AgentDb::lastOutputRound to indicate to the Input module that it has completed this output round.

Match Module. The Match module may be triggered to perform matching by an update to the Config::updateTime attribute, which further indicates the SUD time of the indicators and actual fault scenario. It is updated by ScenarioGen with the SUD time corresponding to the input processing time of the input data that is the time in the SUD corresponding to the input data being processed. It may be expected/required to monotonically increase. The Match module then may perform the matching of the actual fault scenario to the RCT and then indicate it has completed its processing by writing with this SUD time.

FSD may be designed so that the Match module may be executed as a separate process. Thus, if the actual fault scenario is snapshotted in the match process, the input and scenario modules may proceed in parallel to the next rounds while the matching is performed. It is also feasible to execute multiple match processes in parallel, with each taking a disjoint portion of the RCT to match against. Next, the general structure of the modules is considered.

Module Structure. Each module may be structured as a Top entity that serves as an invoke-status interface to the module. They may contain initializing attributes plus various procedures for controlling a given module. In particular, each contains an initconfig and an commitconfig procedure. The initconfig procedure may cause basic initialization of the module without instantiating the implementation constrainer. The commitconfig procedure completes the initialization based on the configuration attributes, instantiating the implementation constrainer. If commitconfig is called without first calling initconfig, it first internally calls initconfig.

This Top invoke-status interface supports Python access to these modules for Python-controlled execution, dynamic configuration, and debugging. Each module has an AgentDb entity that specifies the state to be preserved in sysdb across agent restarts, that is this state may be mounted into sysdb. This structure may be the standard agent structure for each module. This approach is used to allow Match to be run as a separate agent process. It also provides modularity and encapsulation between modules.

Note that Input, ScenarioGen and Match are processing path modules. Config may be the module for configuring this processing pipeline.

Fsd: Scenario, RootCauseTable and Indicators. This module may define the base Scenario, RootCauseTable, and Indicator type definitions plus related value types as well as operations on Scenarios. The Scenario operations may include:
  clone;
  fuse;
  defuse;
  nextKnownSymptom, nextFaultCondition, nextNonfaultCondition;
  setSymptom; and/or
  clearSymptom—making it unknown The RootCauseTable may be a collection of scenarios plus mappings of symptom name to symptom index and vice versa.

The Fsd::Indicator entity is the internal representation of a metric. It may record the estimatedVal of the same, the mode associated with the metric, any fault scenarios assumed by this metric from its inputs, and the confidence in its value.

In one embodiment, the value is represented as an F64 for uniformity and ease of computation. If it is an integer value, it is expected that the 48-bit mantissa is sufficient to perform accurate integer arithmetic.

Debugging Support. There may be an Fsd::Trap type, which is instantiated as a derived type and passed into the ScenarioGen phase. The scenario provides a non-logged trap attribute, allowing a trap to be set on a scenario, even if mounted from sysdb. A trap may also be set on the RCT itself, to trap on failing to match a true fault condition/symptom to anything in the RCT.

Fsd::Match. This module may implement ARCA matching of the actual fault scenario to the collection of potential fault scenarios, aggregated into the RCT. It may implement additional operations on Scenario's, namely:
  1. match; and/or
  2. componentFcNextDiffEntry—difference Note that each column in a row of the RCT is referred to as a symptom because: i) that is a conventional term used in the RCT and ii) it is defined in the RCT because it is needed to identify and/or disambiguate as part of root cause analysis/matching. Note further that a symptom may not necessarily be a faulty condition in itself.

The Match constrainer may be triggered to perform or re-perform the matching and update Fsd::RcaStatus with current root causes by updating Fsd::Config::updateTime. It may have read-only access to the actual fault scenario, sudScenario, and performs the match.

Fsd::Match may allow an agent to be configured to run as just a matching agent, that is to read-only mount the Fsd::Config and the RCT and perform the matching as a separate process from that performing the input and actual scenario generation.

Fsd::ScenarioGen

"Constant" detection. An indicator may be expected to change its value over some period of time in certain modes of operation. For instance, the temperature reading of a cooling system should likely change over time if the system is running. The indicator staying at exactly the same value is often an indication of sensor failure, or inability to read from/connect to the sensor. In some cases, it is also an indication of a problem if an indicator does not change between some minimal amount, given sensor limits on repeatability, that is reading the sensor a second time immediately is not guaranteed to provide exactly the same value.

To support this, the ScenarioGen module tracks whether an indicator has changed since the last output round. If not, it may call the AgentDb::IndicatorMap::updateMappingOnUnchanged to indicate this.

Rationale. The AgentDb::IndicatorMap::updateMappingOnUnchanged call ensures that a map is effectively able to execute on passage of time, even if there is no change to its indicator. There is another case of some indicator having to remain in some state for a minimum period of time.

Debugging Support. The interface may provide setRctTrap and setMapTrap for setting a trap object on the RCT and on a designated map, respectively. The Trap::handle procedure may be called according to the Condition value, which is one or more flags.

Fsd::Input

Indicator Value Computation. The input adapter may compute a first derivative for the input value, adjusting that first derivative after each acceptable input reading. In one form, this is computed as the delta between the last reading and the next reading, divided by the SUD time delta between these two readings.

The value written to the indicator may then be the last value read earlier than the current input round time, plus the first derivative multiplied by the time delta, extrapolating this last value to the input round time.

Consequently, if the input clock rounds are shorter than the input data sample times, the adapter may estimate the intermediate values based on the above interpolation. On the other hand, if the input clock rounds are longer than the input data rounds, the intermediate input data rounds may serve to refine the first derivative value.

Fsd::Input: Indicator Operators. The Input module supports a variety of operators on indicators, such as min, max, sum, average, difference, and so forth. On update to an Indicator::estimatedVal, each indicator for which this indicator is an input is updated according to its associated operator. There may be a variety of input adapters, as described next.

Fsd::Input: EventLog. There may be an input adapter that handles eventlog input.

EventLog::Intf Telemetry Events. Each notification from an update to EventLog::Intf::event may trigger a call to the EventLogAdapter::handleTelemetryEvent procedure.

The EventLogAdapter::advanceInput procedure may unsuspend the input processing of the eventlog if more input from the eventlog is required, and otherwise just generate the next inputs to the associated indicators from the previously read input telemetry data.

EventLog::Intf Non-Telemetry Events. There may also be support for handling non-telemetry events in the eventlog.

CSV Redirect to EventLog::Intf. The CSV adapter may be redirected to translate its input into an eventlog interface, as indicated by the adapters eventLogIntf attribute being non-null. This may be used for testing the eventLog input handling.

CSV Adapter. The adapter may use an input data format including time, site/unit/metric or sensor plus the value. The CSV adapter may iterate over input samples to refine the first derivative for its various indicators until it reads an input for a time later than the current input round. It then saves this last input, and then extrapolates the values for the input indicators to the time of this round using these first derivatives.

Input Adapter Extensibility. An additional input adapter type may be defined by defining a derived type of Input::Main::Adapter that overrides the Adapter::advanceInput to advance the input processing for its data source to handle the current input round. It may also override Adapter::setSyncPoint to save any values that need to be persisted in the agentDb on agent restart. It may also override Adapter::handleDataInExceptionId to react to an exceptionId on the input byte connection, if that arises.

Fsd::Config

Clock Configuration. The Fsd::Config::setClockConfig procedure may be used to specify the microsecondsPerOutputRound and the inputRoundsPerOutputRound. The Fsd::Config::setDiagnosisInterval may specify the start time for the analysis, the end time, both in SUD time, and the warmup time interval. The warmup time interval, if non-zero, may cause FSD to start processing the input dataset at an earlier time than the start time, but only begin the output processing once the input time reaches the start time.

For example, with a 60 second warmup time, the input adapters start in their dataset 60 seconds earlier than the start time and thus "warm up" the state in the FSD indicators before performing any output processing. This capability may be used in starting the FSD processing at a random time rather than continuing the execution from the last state and SUD time of the FSD agent.

Extensibility. The FSD code may be extensible to an arbitrary number of fault conditions/symptoms, root cause specifications, and also new mappings and operations, as described below.

RCT and FC Extensibility. An application may extend the number of symptoms arbitrarily. It may also extend the definition of root causes in terms of these symptoms. For example, an application may have an initial notion of "excessive temperature," which may later be refined into "slightly excessive," "moderately excessive," and "extremely excessive." Similarly, the temporal element may be introduced by providing "excessive temperature for a short time," "excessive temperature for a moderate time," and so forth. These additional refined and constituent symptoms may correspond to additional thresholds in both value and time when mapping indicators to the SUD scenario. Symptoms that are likely to be set together may be best specified from an efficiency standpoint within the same mod32 block of indices.

Indicator Mapping Extensibility. FSD supports extensibility to add additional forms of mapping of an indicator to the SUD fault scenario, beyond: constant value mapping, discrete mapping, threshold-based mapping, and estimatedVal mapping as described above. Additional mappings may thus be extended. To do so, there are two key modules to update: the Fsd::ScenarioGen module and Fsd::Config.

Fsd::ScenarioGen. Fsd::ScenarioGen mapping extension steps include:
1. define a new derived attribute and type of Fsd::ScenarioGen::AgentDb::indicatorMap similar to thresholdMap, defining the parameters this new mapping requires;
2. provide an implementation of the two associated procedures, including updateMapping which is called when the associated input is modified, returning the number of changes to the SUD scenario fault conditions/symptoms; and/or
3. provide a "set" procedure in the Fsd::ScenarioGen::Top interface for setting up the new type of mapping. Note that the ScenarioGen module may expect the parameters to be already checked and just aborts on problems; it does not provide user error reporting without configuration.

Note that a mapping may be independent of the input Indicator mode or can be configurable to different modes. Moreover, a plurality of the same mappings may be configured on the same indicator, one for each mode of interest.

Fsd::Config. Fsd::Config mapping extension steps include:
1. add a derived type of IndicatorMappingJsonConfig::Map in the FsdConfigImpl.tac file;
2. extend the TopImpl::initIndicatorMappingsFromJsonConfig procedure to initialize from JSON this new mapping; and/or
3. provide a "set" procedure in the Fsd::Config::Top interface for setting up your new type of mapping. Note that this procedure may call the ScenarioGen::Top procedure after some error checking, and not change the ScenarioGen::AgentDb so it may work correctly while the agent is in execution.

Indicator Operator Extensibility. FSD may support extensibility to add additional operators, beyond summation, duration, averaging, max, min, standard deviation, and difference as well as the pseudo operator of "input," as described above.

The process of adding additional operators includes two key modules to update: the Fsd::Input module and Fsd::Config.

Fsd::Input. Fsd::Input mapping extension steps include:
1. add a value to the Fsd::Op enumeration for this new operator;
2. add a new derived attribute of Input::AgentDb::indicatorOpBinding to Input.tac;
3. add a new derived attribute of the Input::main::outoperator in the Fsd::InputImpl.tac file, overriding the handleEstimatedVal procedure in the base type. This procedure should update the output when the associated input Indicator::estimatedVal attribute changes; and/or
4. extend the Main::configIndicatorOp procedure in FsdInputImpl.tin to handle configuring this new operator, plus implement the handleEstimatedVal procedure in this file.

Fsd::Config. Fsd::Config operator extension steps include:
1. add an enum value for the operator to the IndicatorJsonConfig::Operator enumeration in FsdConfigImpl.tac; and/or
2. extend the TopImpl::initIndicatorsFromJsonConfig procedure to initialize this operator from JSON when specified in the file.

Note that the Config::Top::bindOperator procedure works with the new operator with the above changes.

FS Agent Restart. In one embodiment, the first step on restart is mounting the RCT read-only. The second is re-mounting for writing the Indicators. The SUD scenario may then be recreated locally. It need not be preserved across restarts because it is set directly by the indicator mapping to the SUD scenario:
1. instantate output interface and any local processing reacting to this;
2. mount/instantiate the RCT;
3. instantiate input processor, specifying the input adapter to use;
4. instantiate the input interfaces in this input processor;
5. instantiate computed indicators; and/or
6. map one or more interfaces and/or indicators.

Interactive FSD. In one embodiment, running FSD interactively is used to test and debug FSD for a given data set. It is based on:
1. a Python cmd package—as used in/src/TaccDebugTools/tacprobe; and/or
2. a Python wrapper like that used in/src/TaccDebugTools/ProbeFacility.py The connection event mechanism may be used for a completion.

In one embodiment, the FSD manager runs FSD at C++ speed and just suspends execution, notifying the CLI/Python when it does. The CLI may concurrently query or monitor the FSD execution, that is while FSD is executing, or it can set a parameter in the manager to cause execution to suspend, or stop.

Summary Testing. In one embodiment, FSD includes various features to allow self-testing using special JSON configuration files and input data files.

Mapping Testing. Threshold testing may be done by having a threshold map on an input indicator, which is mapped as an input data file that generates values that are on the boundaries for the threshold.

RtcTraps may be defined to map the expected traps to the expectedCount and map the others to unexpectedCounts.

Operator Testing. Each operator test may be structured as configuration files and an input file. In one embodiment, the configuration file configures FSD agent to have:
1. a "result" indicator for the operator-under-test, an indicator for each of this operator's inputs, an "expectedResult" indicator, and a "difference" indicator;
2. a threshold map that sets a symptom if the difference indicator shows a value greater than 0, or some acceptable threshold; and/or
3. an RCT trap with an action that specifies isIncrementingUnexpectedMatchCount that is trapping on the match to the RCT row corresponding to the above threshold map condition.

The RCT file may be the same for each operator test. The Indicator file may only differ in the operator that is under test, that is the result node and its arity. In one embodiment, BinaryOpTestIndicator.json with some operator substitution is used, where the operator handles each different mode correctly. The indicator mapping may only differ in the min/max value that the result is allowed to vary from the expected result. Typically, this difference may be zero. The input binding and clocking may vary by the input data file, the running time, and the clocking if there is a difference between input clock and output clock. The trap information is generally the same.

The input file may contain a sequence of time-indexed field-named values that specify the value of each input at a given time plus the expected operator output value at that time. This is normally in the CSV format, but other formats may be supported/used.

The input binding JSON file may bind the appropriate field names to the input indicators. A test failure may be indicated by a root cause being generated in the sudScenario, incrementing the unexpectedMatchCount, as detected by a trap specified on the associated row of the RCT. A trap on the RCT may be used to detect other unexpected matches. Note that a trap on the RCT detects a match of a row whereas a map trap indicates an action by a specific map.

Note also that:
1. multiple operators may be tested by the same configuration and input file. In fact, the same input may be provided to multiple operators;
2. for operators that apply over round/time like summation, averaging, duration, the output clock may run at a lower frequency than the input clock, corresponding to the number of rounds over which the output value is computed; and/or
3. using a threshold map rather than monitoring the exact output of the operator indicator is important, to have the monitoring work from the output clock and avoid transient values out of the result indicator.

In one embodiment, it is assumed that the difference operator plus the RCT, mapping, matching, and trapping mechanism works. The approach of having both the inputs and the expected result stored in the same input file reduces the number of files required for the tests.

Tests may include command line tests for ConstantTest and ThresholdTest, and estimatedVal map, and indicator operator tests such as PredictQualifierOpTest and StepFunc test.

Appendix: Implementation Rationale. The fault scenario representation may be used as it can represent multiple symptoms happening at the same time, either independent or cascading. Therefore, the inputs from multiple agents may be fused to produce a combined or fused scenario that includes symptoms from both. It may also arise because of uncertainty between two symptoms. For example, if the temperature is bad, it is not known if this is because of a temperature sensor failure, because the refrigeration has failed, or both are having problems. Thus, there may be a symptom corresponding to one of the two conditions being true.

It may also be used because root cause analysis typically requires looking at multiple symptoms being true or being false at the same time. For instance, a compressor failure may not be diagnosed when there is no power, that is the power symptom should be false but lack of compressor activity should be true. The RCT is realized as a collection of potential scenarios, one per row, exploiting the ability of the scenario to represent multiple fault conditions/symptoms. The actual scenario may be matched against each of these potential scenarios.

A scenario may also correspond to some case that should not happen. For example, reporting a failure in which the power is out but the compressor is supercycling does not make logical sense. To handle this, the RCT may contain a row that matches/maps to an error condition of "should not happen." The scenarios are typically "partial" scenarios in the sense that some symptom states are not known, or in the RCT, don't care values.

Scenario Representation. In one embodiment, the representation handles false, true, and don't care/don't know/unknown. That is, it is not simply a bool per symptom. FSD handles a large number of scenarios, thus representation should be compact. Many scenarios may have only a few symptoms that are known. Thus, one needs a sparse collection. Having a separate collection for "known" and a sparse symptom collection would be expensive in space and time, given the space cost per entry and the double iteration involved.

Using a "block" of valid bits and their corresponding values bits, for example 32-bits of each in one embodiment, means that the space overhead per entry is likely increased from two pointers plus index plus two bools, or 22 bytes to 28 bytes. Thus, in the totally sparse case, the overhead is roughly 25 percent greater. However, when there are multiple symptoms in the same block, that is some denseness, this overhead is reduced. Moreover, if very dense, the space overhead may be just double or less, whereas the strictly sparse representation may incur a 176×overhead. The representation of blocks of combined subblock of validMask and associated symptom values means that one can skip over subruns of a byte, eight entries, at a time.

"Sensor fusion" is defined herein as the combining of multiple disparate sensor inputs such that the result has less uncertainty than if these sources were used individually. However, by combining multiple sources, one is also exposed to the possibility of multiple failures. In general, it may not be attested that something is wrong with a system unless one knows a specific thing that is wrong with the system, excepting the case of it being "fatally" broken, that is not operating within bounds.

An approach is to use a matrix with root cause as the rows and a column per symptom. Thus, if all the symptoms are detected, the matching row indicates the probable root cause. However, a symptom is defined in general as a subjective measure. It does not lead to a simple representation of a scenario. Instead, a fault or symptom for a fault-scenario is defined as a boolean with the additional value of unknown or don't care. Thus, rather than having an entry in the table of a symptom such as "temperature over 10 C," the fault scenario has a symptom corresponding to that condition, which is either true or false or unknown.

Thus, the model is that a scenario is completely indicated in terms of these ternary symptoms, and the conventional mapping of symptoms to root cause becomes a transform from an array or row of symptoms to a set of scenarios, possibly on a different plane or semantics. For example, a broken fan belt may be regarded as a "root cause," but one may also view it as a fault, and ask why the fan belt broke. A number of faults such as an old fan belt, excessive duty cycle, and perhaps overheating fan bearings may suggest a root cause from this fault. That is, one component's root cause may be another level's fault.

To some degree, there are a large set of potential root causes corresponding to fault scenarios at any given time. The diagnostic procedure and the role of the matching is to reduce this set to a small number which are consistent with the indications from the sensors that the matcher has confidence in. In that sense, it may be regarded as a process of elimination.

RCT Matching Approach. In one embodiment, the matching approach is to iterate over all the rows in the RCT when the actual fault scenario has changed and it is in a new output clock round. This may be rather brute force and excessive when it is possible that the change in the actual fault scenario has not changed any probable root causes or has simply removed one probable root cause. However, it may be quite complicated to track exactly what rows are affected with what symptoms. One special case that seems easy to detect is when there are no known symptoms in the actual fault scenarios. However, this is not expected to occur in most applications because some symptoms are known to be false even in an SUD with no problems.

Filling in Unknowns. In one embodiment, if a scenario matches except for some unknown in the scenario, FSD dynamically creates/extends the inputs and computation network to produce an answer for that unknown.

For example, if a scenario matches a row except for a short-cycling symptom is unknown, FSD may construct internally a scenario mapping/network that provides that this symptom from a configuration specification, that is current reading to startTostart duration to threshold monitor, produces the short-cycling symptom. This may be configured as dependencies:

1. short cycling FC depends on threshold config for start-to-start duration;
2. start-to-start is provided by aggregation code that has compressor mode as input; and/or
3. compressor mode is provided by compressor current input metric.

Handling Dependencies. In one embodiment, the dependencies between different symptoms is handled by the specification of both false and true symptoms in rows of the RCT. For example, if loss of power on a circuit may affect both sensor S1 and S2, a row corresponding to sensor S1 failing may require that the powerFail symptom for that circuit be false. Otherwise, a power failure may be diagnosed as a sensor failure. On the other hand, if both S1 and S2 appear to work yet the current sensor on the sensor circuit indicates no power, it may be inferred that the current sensor has likely failed.

In one embodiment, FSD expects that these dependencies be recognized in the configuration of the RCT. These dependencies are normally known because they are introduced and taken into account in the design of the SUD in the first place, unlike traditional machine learning approaches to root cause analysis.

Confidence and Multiple Actual Fault Scenarios. In one embodiment, FSD supports multiple "actual" fault scenarios at the same time, each corresponding to different interpretations of the sensor inputs. Normally, the different interpretations are one of: i) the sensor input is correct or ii) the sensor input is not correct. This is because, in an engineered system, if the sensor input is correct and adequately measures the state of the SUD, the state of the SUD is known so there is no uncertainty.

Practically however, sensor input is not always correct and it not known whether it is correct or not. Therefore, there is uncertainty about a scenario based on sensor uncertainty. Also, there are often other sensors that may affect confidence in a given sensor. For example, as mentioned previously, if sensors S1 and S2 are observed as functioning correctly yet are dependent on a given circuit which a sensor indicates has no power, the implication is that the current sensor is not working correctly. Nonetheless, it is possible that S1 and S2 are appearing to be correct in some cases even when they have no power. Thus, there are two possible scenarios.

In one embodiment, FSD computes multiple fault scenarios to capture these two different interpretations. It also computes a confidence associated with a scenario. It may then present the root causes for each scenario in order of confidence, or simply the one in which it has the greatest confidence.

This confidence is computed based at least in part on how well the sensor is performing relative to its predicted value. It may also be based at least in part on how well the sensor values correspond to, or are consistent with, that implied by other sensor values or derived values of same. As an example, the well-behaved sensors S1 and S2 are inconsistent with there being no power on the circuit that powers them, reducing the confidence in the current sensor.

With this structure, FSD bears some similarity to so-called "max-sum-product" networks because the max is a special case of picking the scenario which has the highest confidence. However, FSD contrasts with, for example, EMC SMARTS Software because in part they use Hamming distance and pick the minimum distance which means there is at most one root cause. This in turn implies the signatures have to include multiple failure cases, or else they may not be recognized properly. By contrast, FSD uses ternary matching across the whole table and can easily match on multiple root cause rows.

Figure 7:
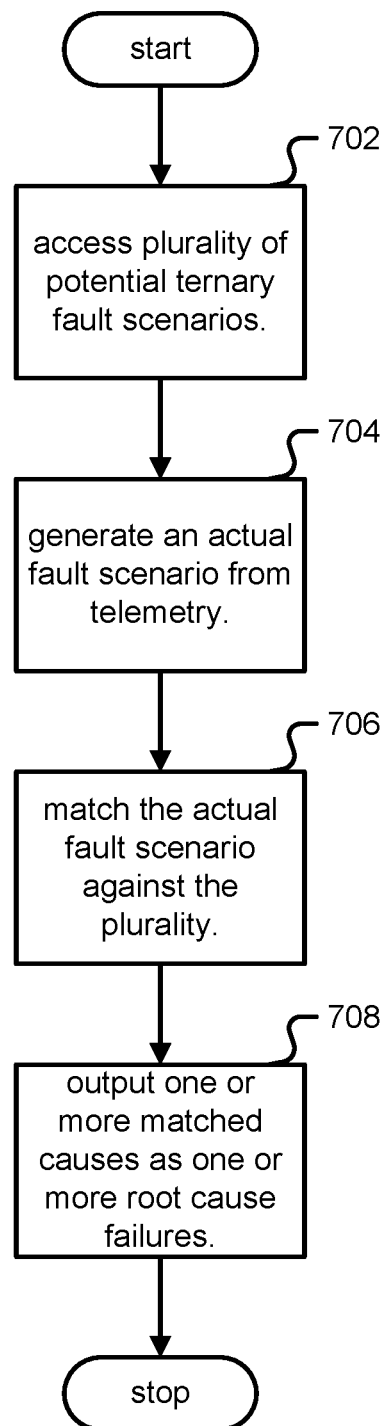
FIG. 7 is a block diagram illustrating an embodiment of a process for automatic root cause analysis using ternary fault scenario representation.

FIG. 7 is a block diagram illustrating an embodiment of a process for automatic root cause analysis using ternary fault scenario representation. In one embodiment, the process of FIG. 7 is carried out primarily by matching engine (504) in FIG. 5A.

In step 702, a plurality of potential fault scenarios (202) are accessed, wherein a given potential fault scenario of the plurality of potential fault scenarios has a corresponding root cause, and a representation of the given potential fault scenario comprises a "don't care" value. In one embodiment, the representation of the given potential fault scenario comprises a ternary value. In one embodiment, a representation of the actual fault scenario comprises a ternary value.

In one embodiment, the given potential fault scenario is automatically generated by a configuration system as described above. In one embodiment, the plurality of potential fault scenarios are arranged in a table (302) comprising ternary values. Ternary values as referred to herein comprise true, false, unknown, and also quaternary values including [0,0], [0,1], [1,1], and [1,1] using the quaternary nomenclature described above of [a, b].

In one embodiment, the hierarchical table structure includes a lower level RCT with a reduced number of symptoms per node of a network. In one embodiment, the hierarchical table structure includes a higher level RCT with a coarse-grained root cause. In one embodiment, the hierarchical table structure includes a higher level RCT for common cases wherein equipment is performing correctly. In one embodiment, the hierarchical table structure includes a lower level RCT for detailed cases wherein equipment is not performing completely correctly.

In step 704, an actual fault scenario (502) is generated from telemetry (604, 606) received from a monitored system (602). In one embodiment, a representation of the actual fault scenario includes an unknown value. In one embodiment, the monitored system includes at least one of the following: a network system, a refrigeration system, an imaging system, and an intrusion detection system.

In step 706, the actual fault scenario (502) is matched (504) against the plurality of potential fault scenarios (302). In one embodiment, matching comprises a precise ternary matching. As referred to herein, 'precise ternary matching' includes: matching true to true denoted {true, true}; false to false denoted {false, false}; and unknown and/or don't care to unknown and/or don't care denoted {unknown, unknown} and/or {x, x}. Using the quaternary nomenclature described above of [a, b], precise ternary matching also includes using the [0,1] combination to mean "not known to be true". This extends the matching to allow the [0,1] combination in a potential root case as well as in the actual fault scenario, so this symptom entry matches the input symptom value as long as it is not true. For instance, if the symptom actually being true contradicts the root cause associated with this table, it should not match, but if the symptom is unknown or false, then it is a match. Using precise ternary matching does not exclude quaternary matching such as described above.

In one embodiment, matching of the actual fault scenario is performed without requiring contemporaneous updating of the actual fault scenario. In one embodiment, the matching is performed on a plurality of processors in parallel.

In step 708, one or more matched causes are output as one or more probable root cause failures (506) of the monitored system (602). In one embodiment, a further step (not shown in FIG. 7) is storing the potential fault scenario in a T-CAM. In one embodiment, a further step (not shown in FIG. 7) is storing each potential fault scenario of the plurality of potential fault scenarios into the same T-CAM. As described above a ternary CAM may also do quaternary matching; a ternary cam comprises both a first ternary CAM having the same "known" and "value" bits and normally treats [0,1] the same as [0,0], and a second ternary CAM that may treat [0,1] differently from [0,0] using the quaternary nomenclature/quaternary matching described above.

Figure 8:
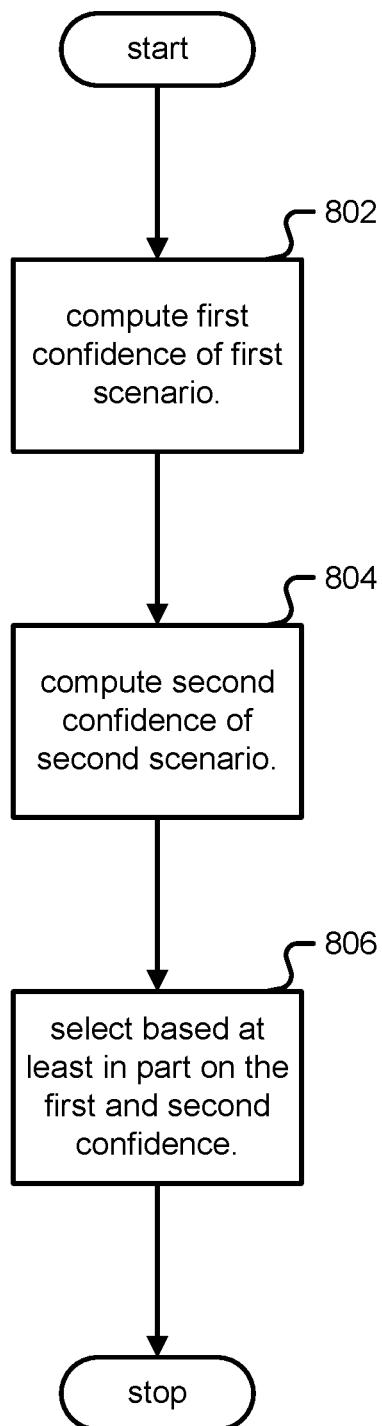
FIG. 8 is a block diagram illustrating an embodiment of a process for confidence and multiple actual fault scenarios.

FIG. 8 is a block diagram illustrating an embodiment of a process for confidence and multiple actual fault scenarios. In one embodiment, the process of FIG. 8 is part of the step 706 of FIG. 7.

In step 802, a first confidence is computed for the actual fault scenario generated in step 704 of FIG. 7. In step 804, a second actual fault scenario is generated from telemetry received from the monitored system (602), and a second confidence is computed for the second actual fault scenario. As described above, the actual fault scenario and second actual fault scenario may differ corresponding to different interpretations of the sensor inputs. For example, there may be uncertainty about a scenario based on sensor uncertainty, or other sensors that may affect confidence in a given sensor.

In step 806, selecting between the actual fault scenario and the second actual fault scenario is based at least in part on a comparison between the first confidence and the second confidence. In one embodiment, it may present both scenarios in order of confidence.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    accessing a potential fault scenario comprising a plurality of symptoms, wherein the potential fault scenario has at least one corresponding root cause, and a representation of the symptom comprises a value having three or more states;
    generating an actual fault scenario from telemetry received from a monitored system;
    matching the actual fault scenario against a plurality of potential fault scenarios comprising the potential fault scenario, wherein matching comprises precise ternary matching;
    wherein precise ternary matching includes matching true to true and matching false to false; and
    outputting one or more matched causes as one or more probable root cause failures of the monitored system.

2. The method of claim 1, wherein the representation of the symptom comprising a value having three or more states comprises a "don't care" state.

3. The method of claim 1, wherein a representation of the actual fault scenario comprises a ternary value having three states.

4. The method of claim 1, wherein precise ternary matching comprises quaternary matching.

5. The method of claim 1, wherein matching of the actual fault scenario is performed without requiring contemporaneous updating of the actual fault scenario.

6. The method of claim 1, wherein a representation of the actual fault scenario includes an unknown state.

7. The method of claim 1, wherein the given potential fault scenario is automatically generated by a configuration system.

8. The method of claim 1, wherein the monitored system includes at least one of the following: a network system; a refrigeration system; an imaging system, and/or an intrusion detection system.

9. The method of claim 1, wherein the plurality of potential fault scenarios are arranged in a table comprising ternary values.

10. The method of claim 1, wherein the plurality of potential fault scenarios are arranged in a hierarchical table structure.

11. The method of claim 10, wherein the hierarchical table structure includes a higher level root cause table (RCT) with a reduced number of symptoms per node of a network.

12. The method of claim 10, wherein the hierarchical table structure includes a higher level RCT with a coarse-grained root cause.

13. The method of claim 10, wherein the hierarchical table structure includes a higher level RCT for common cases wherein equipment is performing correctly.

14. The method of claim 10, wherein the hierarchical table structure includes a lower level RCT for detailed cases wherein equipment is not performing completely correctly.

15. The method of claim 1, wherein the matching is performed on a plurality of processors in parallel.

16. The method of claim 1, further comprising storing the given potential fault scenario in a ternary content addressable memory (T-CAM).

17. The method of claim 1, further comprising storing each potential fault scenario of the plurality of potential fault scenarios into a same T-CAM.

18. The method of claim 1, further comprising generating a second actual fault scenario from second telemetry received from a monitored system, wherein matching comprises: computing a first confidence of the actual fault scenario, computing a second confidence of the second actual fault scenario, and selecting between the actual fault scenario and the second actual fault scenario based at least in part on a comparison between the first confidence and the second confidence.

19. A system, comprising:
a processor configured to:
    access a potential fault scenario comprising a plurality of symptoms, wherein the potential fault scenario has at least one corresponding root cause, and a representation of the symptom comprises a value having three or more states;
    generate an actual fault scenario from telemetry received from a monitored system;
    match the actual fault scenario against a plurality of potential fault scenarios comprising the potential fault scenario, wherein to match the actual fault scenario comprises using precise ternary matching;
    wherein precise ternary matching includes matching true to true and matching false to false; and
    output one or more matched causes as one or more probable root cause failures of the monitored system; and
a memory coupled to the processor and configured to provide the processor with instructions.

20. A computer program product, the computer program product being embodied in a non-transitory computer readable storage medium and comprising computer instructions for:
accessing a potential fault scenario comprising a plurality of symptoms, wherein the potential fault scenario has at least one corresponding root cause, and a representation of the symptom comprises a value having three or more states;
generating an actual fault scenario from telemetry received from a monitored system;
matching the actual fault scenario against a plurality of potential fault scenarios comprising the potential fault scenario, wherein matching comprises precise ternary matching;
wherein precise ternary matching includes matching true to true and matching false to false; and
outputting one or more matched causes as one or more probable root cause failures of the monitored system.

* * * * *

UNITED STATES PATENT AND TRADEMARK OFFICE
CERTIFICATE OF CORRECTION

PATENT NO. : 11,372,708 B2
APPLICATION NO. : 16/942261
DATED : June 28, 2022
INVENTOR(S) : David R. Cheriton It is certified that error appears in the above-identified patent and that said Letters Patent is hereby corrected as shown below:

On the Title Page

Column 2, item (56), other publications, Line 1, delete "intergrated" and insert --integrated--, therefor.

In page 2, Column 1, item (56), other publications, Line 1, delete "intergrated" and insert --integrated--, therefor.

In the Specification

Column 41, Line 1, delete "initconfig" and insert --initConfig--, therefor.

Column 41, Line 1, after "and", delete "an" and insert --a--, therefor.

Column 41, Line 1, delete "commitconfig" and insert --commitConfig--, therefor.

Column 41, Line 2, delete "initconfig" and insert --initConfig--, therefor.

Column 41, Line 4, delete "commitconfig" and insert --commitConfig--, therefor.

Column 41, Line 6, delete "commitconfig" and insert --commitConfig--, therefor.

Column 41, Line 7, delete "initconfig" and insert --initConfig--, therefor.

Column 41, Line 7 & 8, delete "initconfig" and insert --initConfig--, therefor.

Signed and Sealed this
Sixteenth Day of May, 2023

Katherine Kelly Vidal
*Director of the United States Patent and Trademark Office*